(12) United States Patent
Anderson-Straley et al.

(10) Patent No.: US 9,105,951 B2
(45) Date of Patent: Aug. 11, 2015

(54) THERMAL MANAGEMENT SYSTEM USING A PHASE-CHANGE MATERIAL FOR VEHICLE WITH ELECTRIC TRACTION MOTOR

(75) Inventors: Melinda Anderson-Straley, Linden, MI (US); Neil Carpenter, Clarkstown, MI (US); Greg Fritz, Clawson, MI (US); Rick Rajaie, Rochester Hills, MI (US)

(73) Assignee: Magna E-Car Systems of America, Inc., Auburn Hills, MI (US)

( * ) Notice: Subject to any disclaimer, the term of this patent is extended or adjusted under 35 U.S.C. 154(b) by 261 days.

(21) Appl. No.: 13/531,152

(22) Filed: Jun. 22, 2012

(65) Prior Publication Data

US 2012/0327596 A1 Dec. 27, 2012

Related U.S. Application Data

(60) Provisional application No. 61/499,776, filed on Jun. 22, 2011, provisional application No. 61/569,515, filed on Dec. 12, 2011.

(51) Int. Cl.
*B60W 10/00* (2006.01)
*B60W 10/30* (2006.01)
(Continued)

(52) U.S. Cl.
CPC .......... *H01M 10/613* (2015.04); *H01M 10/625* (2015.04); *H01M 10/6567* (2015.04); *H01M 10/6569* (2015.04)

(58) Field of Classification Search
CPC ... Y02T 10/7005; Y02T 10/705; Y02T 90/16; Y02T 10/7077; Y02T 10/26; B60L 11/1874; B60L 1/003; B60L 2240/34; B60L 2240/36; B60L 3/0046; B60L 2240/545; B60L 2240/445; B60L 2240/662; B60L 11/1805; B60L 2240/486; B60L 11/1892; B60L 2260/56; B60L 2270/46; H01M 10/5004; H01M 10/5016; H01M 10/5095; H01M 10/5006; H01M 10/5077; B60H 1/00278; B60H 2001/00307; B60H 1/00428; B60H 1/00385; B60H 2001/003; B60H 2001/00928; B60H 2001/3277; B60H 1/00392; B60H 1/00735; B60H 1/20; B60H 1/32; B60W 10/30; B60K 1/02; B60K 2001/003; B60K 11/00; B60K 11/06
USPC ................... 180/65.1, 65.267, 65.275, 65.31
See application file for complete search history.

(56) References Cited

U.S. PATENT DOCUMENTS 2,083,585 A * 6/1937 Winther ......................... 165/258
2,083,971 A * 6/1937 Winther ......................... 62/134
(Continued)

FOREIGN PATENT DOCUMENTS

WO 2004/009728 A1 1/2004

OTHER PUBLICATIONS

Groulx, Dominic, "MultiPhase Heat Transfer Projects", Lab of Applied MultiPhase Thermal Engineering, Dalhousie University, http://lamte.me.dal.ca/res_multiphase.htm, Aug. 2007.

*Primary Examiner* — J. Allen Shriver, II
*Assistant Examiner* — Bridget Avery
(74) *Attorney, Agent, or Firm* — Dickinson Wright PLLC

(57) ABSTRACT

A phase-change material is used as part of the thermal management system to assist in maintaining a thermal load, such as a battery pack, within a selected temperature range, thereby reducing the consumption of battery power. The phase-change material may be conditioned to an initial state when the vehicle is on-plug and may be used to heat or cool the battery pack directly or indirectly, thereby reducing the use of an electric battery heater. The phase-change material may be used to heat coolant that flows to the thermal load. In another embodiment the phase-change material may be directly within the battery pack in contact with the cells. The phase-change material may be conditioned via the battery circuit heater when the vehicle is on-plug. The phase-change material may also be recharged during vehicle use off-plug using waste heat from the motor circuit thermal load.

20 Claims, 11 Drawing Sheets

(51) Int. Cl.
*B60H 1/00* (2006.01)
*H01M 10/613* (2014.01)
*H01M 10/625* (2014.01)
*H01M 10/6569* (2014.01)
*H01M 10/6567* (2014.01)

(56) References Cited

U.S. PATENT DOCUMENTS

| | | | |
|---|---|---|---|
| 5,289,698 A * | 3/1994 | Garimella | 62/498 |
| 5,386,704 A * | 2/1995 | Benedict | 62/325 |
| 5,390,508 A * | 2/1995 | Benedict | 62/325 |
| 5,555,737 A * | 9/1996 | Takeo et al. | 62/230 |
| 6,750,630 B2 * | 6/2004 | Inoue et al. | 320/104 |
| 7,013,659 B2 * | 3/2006 | Yoshida et al. | 62/186 |
| 7,418,824 B2 * | 9/2008 | Uno et al. | 62/238.6 |
| 7,658,083 B2 * | 2/2010 | Zhu et al. | 62/243 |
| 7,797,954 B2 * | 9/2010 | Duhme et al. | 62/184 |
| 7,975,757 B2 * | 7/2011 | Nemesh et al. | 165/42 |
| 2006/0107681 A1 * | 5/2006 | Uno et al. | 62/323.1 |
| 2008/0184706 A1 * | 8/2008 | Uno et al. | 60/667 |
| 2010/0313587 A1 | 12/2010 | Wolfe, IV et al. | |

* cited by examiner

THERMAL MANAGEMENT SYSTEM USING A PHASE-CHANGE MATERIAL FOR VEHICLE WITH ELECTRIC TRACTION MOTOR

CROSS-REFERENCE TO RELATED APPLICATIONS

This application claims the benefit of U.S. Provisional Patent Applications No. 61/499,776, filed Jun. 22, 2011 and 61/569,515, filed Dec. 12, 2011, the disclosures of both of which are incorporated by reference as if fully set forth in detail herein.

FIELD

Aspects of this disclosure relate to vehicles that are powered at least partly by an electric motor and more particularly to battery electric vehicles with no internal combustion engine on board.

BACKGROUND

Vehicles offer the promise of powered transportation through the use of electric motors while producing few or no emissions. Some electric vehicles are powered by electric motors only and rely solely on the energy stored in an on-board battery pack. Other electric vehicles are hybrids, and include an internal combustion engine, which may, for example, be used to assist the electric motor in driving the wheels (a parallel hybrid), or which may, for example, be used solely to charge the on-board battery pack, thereby extending the operating range of the vehicle (a series hybrid). In some vehicles, there is a single, centrally-positioned electric motor that powers one or more of the vehicle wheels, and in other vehicles, one or more of the wheels have an electric motor positioned at each driven wheel.

While currently proposed and existing vehicles are advantageous in some respects over internal-combustion engine powered vehicles, there are problems that are associated with some electric vehicles. A particular problem is that their range is typically relatively short as compared to internal combustion engine-powered vehicles. This is particularly true for battery electric vehicles that are not equipped with range extender engines. A reason for this limitation is the weight and cost of the battery packs used to store energy for the operation of such vehicles. It would be beneficial to provide technology that improves the efficiency with which power is used in the operation of the vehicle, so as to improve the range of such vehicles.

SUMMARY

In a first aspect, a thermal management system is provided for an electric vehicle. The thermal management system includes a motor circuit for cooling a motor circuit thermal load and a second circuit, which may be, for example, a cabin heating circuit for heating a cabin heater or a battery circuit for managing the temperature of a battery circuit thermal load. The second circuit can be isolated from the motor circuit so that the coolant in the second circuit can be brought to a temperature that is different from the temperature of the coolant in the motor circuit. In an embodiment, a single valve can be moved from a first position wherein coolant flow passes between two of the circuits to a second position wherein the two circuits are fluidically isolated from each other.

In a particular embodiment of the first aspect, the thermal management system includes a motor circuit, a cabin heating circuit for heating a passenger cabin, a motor circuit temperature sensor, and a control system. The motor circuit is configured for cooling a motor circuit thermal load including the traction motor. The motor circuit thermal load has a motor circuit thermal load inlet and a motor circuit thermal load outlet. The motor circuit includes a radiator, a first motor circuit conduit fluidically between the radiator and the motor circuit thermal load inlet, a second motor circuit conduit fluidically between the radiator and the motor circuit thermal load outlet, and a motor circuit pump positioned to pump coolant through the motor circuit. The cabin heating circuit is configured for heat exchange with a cabin heating circuit thermal load which includes a cabin heater for heating the cabin. The cabin heating circuit thermal load has a cabin heating circuit thermal load inlet and a cabin heating circuit thermal load outlet, a first cabin heating circuit conduit fluidically between the motor circuit and the cabin heating circuit thermal load inlet, a second cabin heating circuit conduit fluidically between the cabin heating circuit thermal load outlet and the motor circuit, a third cabin heating circuit conduit fluidically between the second and first cabin heating circuit conduits, a cabin heating circuit heater positioned to heat coolant in the cabin heating circuit, a cabin heating circuit valve positionable in a first position wherein coolant flow between the motor circuit and the cabin heating circuit is substantially prevented and a second position wherein coolant flow between the motor circuit and the cabin heating circuit is permitted, and a cabin heating circuit pump positioned to pump coolant through the cabin heating circuit. The motor circuit temperature sensor is positioned to detect the temperature of coolant in the second motor circuit conduit. The control system is operatively connected to the cabin heating circuit valve, the cabin heating circuit heater and to the cabin heating circuit pump. The control system is programmed such that when the cabin heating circuit thermal load requires heat and the temperature sensed by the motor circuit temperature sensor is sufficiently high the control system turns off the cabin heating circuit heater and moves the cabin heating circuit valve to the second position, and when the cabin heating circuit thermal load requires heat and the temperature sensed by the motor circuit temperature sensor is sufficiently low the control system turns on the cabin heating circuit heater, operates the cabin heating circuit pump and moves the cabin heating circuit valve to the first position.

In another particular embodiment of the first aspect, the thermal management system includes a motor circuit, a battery circuit for controlling the temperature of a battery circuit thermal load which includes at least one battery pack, a motor circuit temperature sensor, and a control system. The motor circuit is configured for cooling a motor circuit thermal load including the traction motor. The motor circuit thermal load has a motor circuit thermal load inlet and a motor circuit thermal load outlet. The motor circuit includes a radiator, a first motor circuit conduit fluidically between the radiator and the motor circuit thermal load inlet, a second motor circuit conduit fluidically between the radiator and the motor circuit thermal load outlet, and a motor circuit pump positioned to pump coolant through the motor circuit. The battery circuit is configured for controlling the temperature of a battery circuit thermal load which includes the at least one battery pack. The battery circuit thermal load has a battery circuit thermal load inlet and a battery circuit thermal load outlet. The battery circuit includes a first battery circuit conduit fluidically between the motor circuit and the battery circuit thermal load inlet, a second battery circuit conduit fluidically between the battery circuit thermal load outlet and the motor circuit, a third battery circuit conduit fluidically between the second battery circuit conduit and the first battery circuit conduit, a battery circuit heater positioned to heat coolant in the battery circuit, a battery circuit valve positionable in a first position wherein coolant flow between the motor circuit and the battery circuit is substantially prevented and a second position wherein coolant flow between the motor circuit and the battery circuit is permitted, and a battery circuit pump positioned to pump coolant through the battery circuit. The motor circuit temperature sensor is positioned to detect the temperature of coolant in the second motor circuit conduit. The control system is operatively connected to the battery circuit valve, the battery circuit heater and to the battery circuit pump. The control system is programmed such that when heating of the battery circuit thermal load is required and the temperature sensed by the motor circuit temperature sensor is sufficiently high the control system turns off the battery circuit heater and moves the battery circuit valve to the second position, and when heating of the battery circuit thermal load is required and the temperature sensed by the motor circuit temperature sensor is sufficiently low the control system turns on the battery circuit heater, operates the battery circuit pump and moves the battery circuit valve to the first position.

In a second aspect, a thermal management system is provided for an electric vehicle including a motor circuit for cooling a motor circuit thermal load, a cabin heating circuit for heating a cabin heater and a battery circuit for managing the temperature of a battery circuit thermal load. All of these circuits can fluidically communicate with each other and a single radiator can cool the coolant from all of these circuits. In an embodiment, the system includes a main cooling circuit which includes a compressor and a condenser.

In a particular embodiment of the second aspect, the thermal management system includes a motor circuit, a cabin heating circuit for heating a passenger cabin, a battery circuit for controlling the temperature of a battery circuit thermal load which includes at least one battery pack, a motor circuit temperature sensor, and a control system. The motor circuit is configured for cooling a motor circuit thermal load including the traction motor. The motor circuit thermal load has a motor circuit thermal load inlet and a motor circuit thermal load outlet. The motor circuit includes a radiator, a first motor circuit conduit fluidically between the radiator and the motor circuit thermal load inlet, a second motor circuit conduit fluidically between the radiator and the motor circuit thermal load outlet, and a motor circuit pump positioned to pump coolant through the motor circuit. The cabin heating circuit is configured for heat exchange with a cabin heating circuit thermal load which includes a cabin heater for heating the cabin. The cabin heating circuit thermal load has a cabin heating circuit thermal load inlet and a cabin heating circuit thermal load outlet, a first cabin heating circuit conduit fluidically between the motor circuit and the cabin heating circuit thermal load inlet, a second cabin heating circuit conduit fluidically between the cabin heating circuit thermal load outlet and the motor circuit, a third cabin heating circuit conduit fluidically between the second and first cabin heating circuit conduits, a cabin heating circuit heater positioned to heat coolant in the cabin heating circuit, a cabin heating circuit valve positionable in a first position wherein coolant flow between the motor circuit and the cabin heating circuit is substantially prevented and a second position wherein coolant flow between the motor circuit and the cabin heating circuit is permitted, and a cabin heating circuit pump positioned to pump coolant through the cabin heating circuit. The motor circuit temperature sensor is positioned to detect the temperature of coolant in the second motor circuit conduit. The battery circuit is configured for controlling the temperature of a battery circuit thermal load which includes the at least one battery pack. The battery circuit thermal load has a battery circuit thermal load inlet and a battery circuit thermal load outlet. The battery circuit includes a first battery circuit conduit fluidically between the motor circuit and the battery circuit thermal load inlet, a second battery circuit conduit fluidically between the battery circuit thermal load outlet and the motor circuit, a third battery circuit conduit fluidically between the second battery circuit conduit and the first battery circuit conduit, a battery circuit heater positioned to heat coolant in the battery circuit, a battery circuit valve positionable in a first position wherein coolant flow between the motor circuit and the battery circuit is substantially prevented and a second position wherein coolant flow between the motor circuit and the battery circuit is permitted, and a battery circuit pump positioned to pump coolant through the battery circuit. The control system is operatively connected to the cabin heating circuit valve to control the flow of coolant between the motor circuit and the cabin heating circuit and operatively connected to the battery circuit valve to control the flow of coolant between the motor circuit and the battery circuit, such that heat transferred to coolant in the motor circuit by the motor circuit thermal load is removed from the coolant by at least one of the group selected from the cabin heating circuit thermal load, the battery circuit thermal load and the radiator.

In a third aspect, a thermal management system is provided for an electric vehicle including a traction motor and at least one battery pack. The thermal management system is capable of heating the at least one battery pack using a low voltage heater.

The thermal management system includes a battery circuit that is configured for controlling the temperature of a battery circuit thermal load including the at least one the battery pack, and including a battery circuit thermal load inlet and a battery circuit thermal load outlet. The battery circuit includes a first battery circuit conduit extending to the battery circuit thermal load inlet, a second battery circuit conduit from the battery circuit thermal load outlet, a third battery circuit conduit fluidically between the second battery circuit conduit and the first battery circuit conduit, and a battery circuit pump in the first battery circuit conduit configured to pump coolant through the battery circuit. The thermal management system includes a battery charge control module. When the vehicle is plugged into an electrical source the battery charge control module receives energy from the electrical source and processes the energy for storage in the at least one battery pack. When the at least one battery pack is below a selected battery pack temperature and the vehicle is plugged into an electrical source the control system is programmed to position the battery circuit valve in the second position wherein heat generated in the battery charge control module heats coolant passing through therethrough. The coolant is circulated to the at least one battery pack to heat the at least one battery pack. A battery circuit heater is positioned to heat coolant in the battery circuit. The battery circuit heater is configured to operate with an inlet voltage of 12 VDC.

In a fourth aspect, a thermal management system for an electric vehicle including a traction motor and at least one battery pack. The thermal management system includes a motor circuit a battery circuit, a main cooling circuit, a motor circuit temperature sensor and a control system. The motor circuit is configured for cooling a motor circuit thermal load including the traction motor. The motor circuit thermal load has a motor circuit thermal load inlet and a motor circuit thermal load outlet. The motor circuit includes a radiator, a first motor circuit conduit fluidically between the radiator and the motor circuit thermal load inlet, a second motor circuit conduit fluidically between the radiator and the motor circuit thermal load outlet, and a motor circuit pump positioned to pump coolant through the motor circuit. The battery circuit is configured for controlling the temperature of a battery circuit thermal load which includes the at least one battery pack. The battery circuit thermal load has a battery circuit thermal load inlet and a battery circuit thermal load outlet. The battery circuit includes a first battery circuit conduit fluidically between the second motor circuit conduit upstream from the radiator and the battery circuit thermal load inlet, a second battery circuit conduit fluidically between the battery circuit thermal load outlet and the first motor circuit conduit, a third battery circuit conduit fluidically between the second battery circuit conduit and the first battery circuit conduit, a chiller positioned to cool coolant in the battery circuit, the chiller having a refrigerant inlet and a refrigerant outlet, a battery circuit valve positionable in a first position wherein coolant flow between the motor circuit and the battery circuit is substantially prevented and a second position wherein coolant flow between the motor circuit and the battery circuit is permitted, and a battery circuit pump positioned to pump coolant through the battery circuit. The main cooling circuit includes a compressor, a first cooling circuit conduit positioned upstream of the compressor and positioned for receiving refrigerant from the refrigerant outlet of the evaporator and for receiving refrigerant from the refrigerant outlet of the chiller, a condenser positioned downstream from the compressor, a second cooling circuit conduit positioned downstream of the condenser and positioned for delivering refrigerant to the refrigerant inlet of the chiller and to the refrigerant inlet of the evaporator and a chiller refrigerant flow control valve positioned for controlling the flow of refrigerant through the chiller. The motor circuit temperature sensor is positioned to detect the temperature of coolant in the second motor circuit conduit. The control system is operatively connected to the chiller refrigerant flow control valve, the evaporator refrigerant flow control valve, the battery circuit valve, the battery circuit pump and the compressor. The control system is programmed to open the chiller refrigerant flow control valve based on a comparison of the temperature sensed by the motor circuit temperature sensor and a target temperature for the battery circuit thermal load, and to open the evaporator refrigerant flow control valve based on a temperature setting of a climate control system for the passenger cabin.

Another aspect relates to the use of a phase-change material as part of the thermal management system to assist in maintaining the one or more battery packs in the vehicle within a selected temperature range, thereby reducing the consumption of battery power for that purpose. In particular the phase-change material may be conditioned to an initial state when the vehicle is on-plug and may be used to heat or cool the battery pack directly or indirectly, thereby reducing the use of an electric battery heater. In one embodiment the phase-change material may be used to heat coolant that flows to the battery pack. In another embodiment the phase-change material may be directly within the battery pack in contact with the cells. The phase-change material may itself be recharged (i.e. conditioned to an initial state) via the battery circuit heater (or some other heating means) when the vehicle is on-plug. The phase-change material may also be recharged during vehicle use off-plug using waste heat from the motor circuit thermal load.

Another aspect relates to the use of a phase-change material as part of the thermal management system to assist in heating the cabin in the vehicle, thereby reducing the consumption of battery power for that purpose. The phase-change material may be conditioned to an initial state when the vehicle is on-plug and may be used to heat coolant that enters the cabin heater thereby reducing the use of an electric cabin circuit heater for heating the coolant. The phase-change material may itself be conditioned via the cabin circuit heater (or some other heating means) when the vehicle is on-plug. The phase-change material may also be recharged during vehicle use off-plug using waste heat from the motor circuit thermal load.

Yet another aspect relates to the use of a phase-change material as part of the cooling circuit for the thermal management system. The phase-change material may, for example, be downstream from the evaporator and upstream from the compressor (i.e. on the suction line). In another embodiment, the phase-change material may, for example, be downstream from the condenser and upstream from the thermal expansion valve and evaporator (i.e. on the liquid line).

In yet another embodiment, phase-change material could be used as an internal heat exchanger (IHX), contacting both the suction and liquid lines.

Yet another aspect relates to the use of a phase-change material module containing a phase-change material that is connected to both the battery circuit and to the cabin heating circuit. Draw and return conduits extend between the phase-change material and the cabin heating and battery circuits. A suitable control valve system is provided to permit the flow from either the cabin heating circuit or the battery circuit to be passed through a heat exchanger containing the phase-change material. The phase-change material is connected to a heating source for recharging when the vehicle is on-plug. Optionally the phase-change material is also connected to the motor circuit for recharging during use of the vehicle off-plug.

In yet another aspect, the phase-change material module may contain a plurality of phase-change materials each of which has a selected transition temperature to handle different temperature needs for the coolant flows. For example, one phase-change material that is at a higher temperature (e.g. 85 degrees Celsius) may be used to heat coolant when needed, while another phase-change material at a transition temperature of 0 degrees Celsius may be used to cool coolant when needed.

In yet another aspect, a thermal management system is provided for a vehicle having an electric traction motor, a battery pack and a passenger cabin, including The thermal management system includes a motor circuit, a battery circuit, a first phase-change material module, a second phase-change material module, and a valve system. The motor circuit is configured for circulating coolant through a motor circuit thermal load including the traction motor. The cabin heating circuit is configured for circulating coolant through a cabin circuit thermal load including a cabin heater core. The battery circuit is configured for circulating coolant through a battery circuit thermal load including the battery pack. The first phase-change material module includes a first phase-change material that has a selected first transition temperature. The second phase-change material module includes a second phase-change material that has a selected second transition temperature. The valve system is configured for controlling the flow of coolant through the first phase-change material module from the cabin heating circuit, optionally based at least in part on the temperature of the coolant in relation to the first transition temperature of the first phase-change material, and for controlling the flow of coolant through the second phase-change material module from the battery circuit, optionally based at least in part on the temperature of the coolant in relation to the second transition temperature of the second phase-change material.

In yet another aspect, a thermal management system is provided for a vehicle having an electric traction motor, a battery pack and a passenger cabin. The thermal management system includes a motor circuit, a battery circuit, a phase-change material module and at least one phase-change material module flow control valve. The motor circuit is configured for circulating coolant through a motor circuit thermal load including the traction motor. The battery circuit is configured for circulating coolant through a battery circuit thermal load including the battery pack. The motor circuit is selectably fluidically communicable with the battery circuit. The phase-change material module includes a phase-change material that has a selected transition temperature. The phase-change material extends between a plurality of adjacent pairs of cells of the battery pack. The at least one phase-change material module flow control valve positioned for controlling the flow of coolant through the phase-change material module from the motor circuit.

In yet another aspect, a thermal management system is provided for a vehicle having an electric traction motor, a battery pack and a passenger cabin. The thermal management system includes a motor circuit, a cabin heating circuit, a phase-change material module and at least one phase-change material module flow control valve. The motor circuit is configured for circulating coolant through a motor circuit thermal load including the traction motor. The cabin heating circuit is configured for circulating coolant through a cabin circuit thermal load including a cabin heater core. The motor circuit is selectably fluidically communicable with the cabin heating circuit. The phase-change material module includes a phase-change material that has a selected transition temperature. The at least one phase-change material module flow control valve is positioned for controlling the flow of coolant through the phase-change material module from at least one of the motor circuit and the cabin heating circuit, optionally based at least in part on the temperature of the coolant in relation to the transition temperature of the phase-change material.

In yet another aspect, a thermal management system is provided for a vehicle having an electric traction motor, a battery pack and a passenger cabin. The thermal management system includes a motor circuit, a battery circuit, a phase-change material module and at least one phase-change material module flow control valve. The motor circuit is configured for circulating coolant through a motor circuit thermal load including the traction motor. The battery circuit is configured for circulating coolant through a battery circuit thermal load including the battery pack. The motor circuit is selectably fluidically communicable with the battery circuit. The phase-change material module includes a phase-change material that has a selected transition temperature. The at least one phase-change material module flow control valve is positioned for controlling the flow of coolant through the phase-change material module from at least one of the motor circuit and the battery circuit, optionally based at least in part on the temperature of the coolant in relation to the transition temperature of the phase-change material.

BRIEF DESCRIPTION OF THE DRAWINGS

Embodiments will now be described, by way of example only, with reference to the attached drawings, in which.

DETAILED DESCRIPTION

In this specification and in the claims, the use of the article "a", "an", or "the" in reference to an item is not intended to exclude the possibility of including a plurality of the item in some embodiments. It will be apparent to one skilled in the art in at least some instances in this specification and the attached claims that it would be possible to include a plurality of the item in at least some embodiments.

Figure 1:
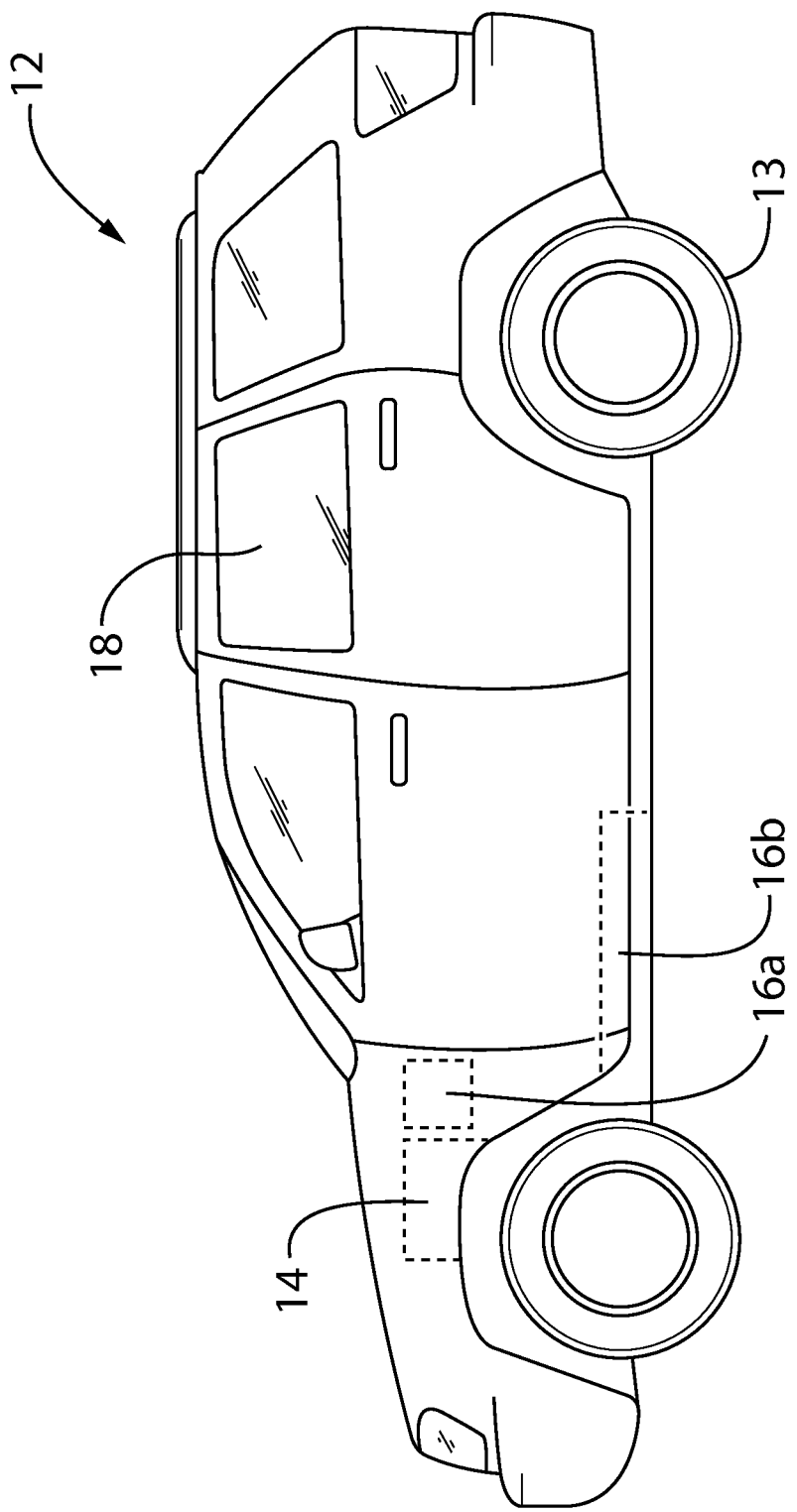
FIG. 1 is a perspective view of an electric vehicle that includes a thermal management system.
Figure 2:
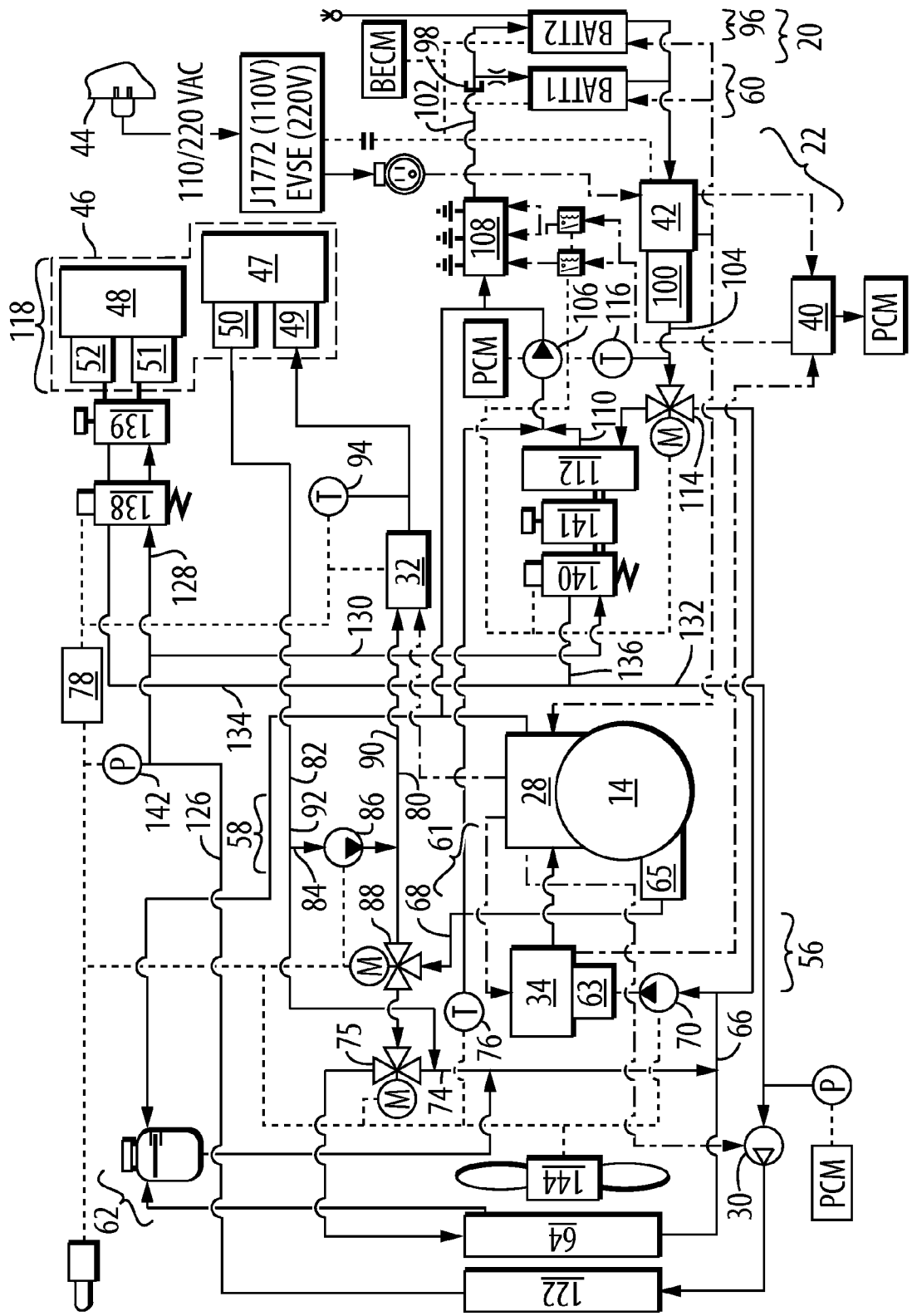
FIG. 2 is a schematic illustration of a thermal management system for the electric vehicle.

Reference is made to FIG. 2, which shows a schematic illustration of a thermal management system 10 for an electric vehicle 12 shown in FIG. 1. The term 'electric vehicle' as used herein denotes a vehicle that includes an electric traction motor (which may be referred to simply as an 'electric motor', a 'traction motor' or a 'motor' for convenience). The electric vehicle 10 may also include an internal combustion engine, or alternatively it may lack an internal combustion engine. In embodiments wherein an internal combustion engine is provided, the engine may be operated simultaneously with the electric traction motor (parallel hybrid), or it may be operated only when the battery pack 16 for the electric traction motor has been substantially depleted (or depleted to a minimum acceptable state of charge). In embodiments wherein the engine is provided, the function of the engine may be to propel the vehicle, to charge the battery pack, both propelling the vehicle and charging the battery pack, or for some other reason. Furthermore, the electric vehicle 12 may be any suitable type of vehicle, such as, for example, an automobile, a truck, an SUV, a bus, a van or any other type of vehicle.

The electric vehicle 12 includes wheels 13, a traction motor 14 for driving the wheels 13, first and second battery packs 16a and 16b, a cabin 18, a high voltage electrical system 20 (FIG. 2) and a low voltage electrical system 22 (FIG. 2).

The motor 14 may have any suitable configuration for use in powering the electric vehicle 12. The motor 14 may be mounted in a motor compartment that is forward of the cabin 18 and that is generally in the same place an engine compartment is on a typical internal combustion powered vehicle. Referring to FIG. 2, the motor 14 generates heat during use and thus requires cooling. To this end, the motor 14 includes a motor coolant flow conduit for transporting coolant about the motor 14 so as to maintain the motor within a suitable temperature range. The term 'coolant' denotes a coolant that is transported through and/or around components for controlling the temperature of those components. The coolant may in some instances draw heat from the components so as to cool the components, or, in other instances, the coolant may transfer heat contained therein to the components so as to heat the components.

A transmission control system shown at 28 is part of the high voltage electrical system 20 and is provided for controlling the current flow to high voltage electrical loads within the vehicle 12, such as the motor 14, an air conditioning compressor 30, a heater 32 and a DC/DC converter 34. The transmission control system 28 generates heat during use and thus has a transmission control system coolant flow conduit associated therewith, for transporting coolant about the transmission control system 28 so as to maintain the transmission control system 28 within a suitable temperature range. The transmission control system 28 may be positioned immediately upstream fluidically from the motor 14.

The DC/DC converter 34 receives current from the transmission control system 28 and converts it from high voltage to low voltage. The DC/DC converter 34 sends the low voltage current to a low voltage battery shown at 40, which is used to power low voltage loads in the vehicle 12. The low voltage battery 40 may operate on any suitable voltage, such as 12 V.

The battery packs 16a and 16b send power to the transmission control system 28 for use by the motor 14 and other high voltage loads and thus form part of the high voltage electrical system 20. The battery packs 16a and 16b may be any suitable types of battery packs. In an embodiment, the battery packs 16a and 16b are each made up of a plurality of lithium polymer cells. The battery packs 16a and 16b have a temperature range (shown in FIG. 3) in which the battery packs 16a and 16b may be maintained so as to provide them with a relatively long operating life. While two battery packs 16a and 16b are shown, it is alternatively possible to have any suitable number of battery packs, such as one battery pack, or 3 or more battery packs depending on the packaging constraints of the vehicle 12.

A battery charge control module shown at 42 is provided and is configured to connect the vehicle 12 to an electrical source (e.g. a 110V source, or a 220V source) shown at 44, and to send the current received from the electrical source 44 to any of several destinations, such as, the battery packs 16a and 16b, the transmission control system 28 and the low voltage battery 40. The battery charge control module 42 generates heat during use and thus requires cooling. To this end, the battery charge control module 42 includes a battery charge control module coolant flow conduit for transporting coolant about the battery charge control module 42 from a battery charge control module inlet 4 to a battery charge control module outlet 26 so as to maintain the battery charge control module 42 within a suitable temperature range.

An HVAC system 46 is provided for controlling the temperature of the cabin 18 (FIG. 1). The HVAC system 46 is configured to be capable of both cooling and heating the cabin 18. To achieve this, the HVAC system 46 may include one or more heat exchangers, such as a cabin heating heat exchanger 47 and a cabin cooling heat exchanger 48 (which may be referred to as evaporator 48). The cabin heating heat exchanger 47 has a coolant inlet 49 and a coolant outlet 50 and is used to heat an air flow that is passed into the cabin 18. The cabin cooling heat exchanger 48 includes a refrigerant inlet 51 and a refrigerant outlet 52, and is used to cool an air flow that is passed into the cabin 18.

The motor 14, the transmission control system 28, the DC/DC converter 34, the battery packs 16a and 16b, the battery charge control module 42 and the HVAC system 46 constitute thermal loads on the thermal management system 10.

The thermal management system 10 includes a motor circuit 56, a cabin heating circuit 58, a battery circuit 60 and a main cooling circuit 62. The motor circuit 56 is configured for cooling the traction motor 14, the transmission control system 28 and the DC/DC converter 34, which constitute a motor circuit thermal load 61, which has a motor circuit thermal load inlet 63 and a motor circuit thermal load outlet 65. The motor circuit 56 includes a radiator 64, a first motor circuit conduit 66 fluidically between the radiator 64 to the motor circuit thermal load inlet 63, a second motor circuit conduit 68 fluidically between the motor circuit thermal load outlet 65 and the radiator 64, and a motor circuit pump 70 positioned to pump coolant through the motor circuit 56.

Additionally a third motor circuit conduit 74 may be provided fluidically between the second and first motor circuit conduits 68 and 66 so as to permit the flow of coolant to bypass the radiator 64 when possible (e.g. when the coolant is below a selected threshold temperature). To control whether the flow of coolant is directed through the radiator 64 or through the third motor circuit conduit 74, a radiator bypass valve 75 is provided and may be positioned in the second motor circuit conduit 68. The radiator bypass valve 75 is controllable so that in a first position it directs the flow of coolant to the radiator 64 through the second motor circuit conduit 68 and in a second position it directs the flow of coolant to the first motor circuit conduit 66 through the third motor circuit conduit 74, so as to bypass the radiator 64. Flow through the third motor circuit conduit 74 is easier than flow through the radiator 64 (i.e. there is less of a pressure drop associated with flow through the third conduit than there is with flow through the radiator 64) and so bypassing the radiator 64 whenever possible, reduces the energy consumption of the pump 70. By reducing the energy consumed by components in the vehicle 12 (FIG. 1), the range of the vehicle can be extended, which is particularly advantageous in electric vehicles.

It will be noted that only a single radiator bypass valve 75 is provided for bypassing the radiator 64. When the radiator bypass valve 75 is in the first position, all of the coolant flow is directed through the second conduit 68, through the radiator 64 and through the first conduit 66. There is no net flow through the third conduit 74 because there is no net flow into the third conduit. Conversely, when the radiator bypass valve 75 is in the second position, all of the coolant flow is directed through the third conduit 74 and back to the first conduit 66. There is no net flow through the radiator 64 because there is no net flow into the radiator 64. Thus, using only a single valve (i.e. the bypass valve 75) provides the capability of selectably bypassing the radiator 64, instead of using one valve at the junction of the second and third conduits 68 and 74 and another valve at the junction of the first and third conduits 66 and 74. As a result of using one valve (i.e. valve 75) instead of two valves, the motor circuit 56 contains fewer components, thereby making it less expensive, simpler to make and to operate and more reliable. Furthermore by eliminating one valve, the energy required to move the coolant through the motor circuit 56 is reduced, thereby reducing the energy consumed by the pump 70 and extending the range of the vehicle 12 (FIG. 1).

The pump 70 may be positioned anywhere suitable, such as in the first motor circuit conduit 66.

The elements that make up the motor circuit thermal load may be arranged in any suitable way. For example, the DC/DC converter 34 may be downstream from the pump 70 and upstream from the transmission control system 28, and the motor 14 may be downstream from the transmission control system 28. Thus, the inlet to the DC/DC converter 34 constitutes the thermal load inlet 63 and the motor outlet constitutes the thermal load outlet 65.

A motor circuit temperature sensor 76 is provided for determining the temperature of coolant at a selected point in the motor circuit 56. As an example, the motor circuit temperature sensor 76 may be positioned downstream from all the thermal loads in the motor circuit 56, so as to record the highest temperature of the coolant. Based on this temperature, a control system, shown at 78 can determine whether or not to position the radiator bypass valve 75 in a first position wherein the radiator bypass valve 75 transfers the flow of coolant towards the radiator 64 and a second position wherein the radiator bypass valve 75 bypasses the radiator 64 and transfers the flow of coolant through the third motor circuit conduit 74 back to the first motor circuit conduit 66. While the control system 78 has been shown in FIG. 2 as a single block, it will be understood by persons skilled in the art that in practice the control system 78 may be a complex distributed control system having multiple individual controllers connected to one another over a communications area network.

The cabin heating circuit 58 is configured for providing heated coolant to the HVAC system 46 such as, for example, to the cabin heating heat exchanger 47, which constitutes the cabin heating circuit thermal load. The cabin heating circuit 58 includes a first cabin heating circuit conduit 80 fluidically between the second motor circuit conduit 68 and the cabin heating heat exchanger inlet 49 (which in the embodiment shown is the inlet to the cabin heating circuit thermal load), a second cabin heating circuit conduit 82 fluidically between the cabin heating circuit heat exchanger outlet 50 (which in the embodiment shown is the outlet from the cabin heating circuit thermal load) to the motor circuit 56. In the embodiment shown the second cabin heating circuit conduit 82 extends to the third motor circuit conduit 74. This is because the cabin heating heat exchanger 47 serves to cool the coolant by some amount, so that the resulting cooled coolant need not be passed through the radiator 64 in the motor circuit 56. By reducing the volume of coolant that passes through the radiator 64, energy consumed by the pump 70 is reduced, thereby extending the range of the vehicle 12 (FIG. 1). It will be understood that in an alternative embodiment however, the second cabin heating circuit conduit 82 may extend to the second motor circuit conduit 68 downstream so that the coolant contained in the second cabin heating circuit conduit 82 passes through the radiator 64.

In some situations the coolant will not be sufficiently hot to meet the demands of the HVAC system 46. For such situations, the heater 32 which may be referred to as the cabin heating circuit heater 32 is provided in the first cabin heating circuit conduit 80. The cabin heating circuit heater 32 may be any suitable type of heater, such as an electric heater that is one of the high voltage electrical components fed by the transmission control system 28.

A third cabin heating circuit conduit 84 may be provided between the second and first cabin heating circuit conduits 82 and 80. A cabin heating circuit pump 86 is provided in the third conduit 84. In some situations it will be desirable to circulate coolant through the cabin heating circuit 58 and not to transfer the coolant back to the motor circuit 56. For example, when the coolant is being heated by the heater 32 it may be advantageous to not transfer the coolant back to the motor circuit 56 since the coolant in the motor circuit 56 is used solely for cooling the thermal load 61 and it is thus undesirable to introduce hot coolant into such a circuit. For the purpose of preventing coolant from being transferred from the cabin heating circuit 58 back to the motor circuit 56, a cabin heating circuit valve 88 is provided. In the embodiment shown, the cabin heating circuit valve 88 is positioned in the second motor circuit conduit 68 and is positionable in a first position wherein the valve 88 directs coolant flow towards the radiator 64 through the second motor circuit conduit 68, and a second position wherein the valve 88 directs coolant flow towards the cabin heater heat exchanger 47 through the first cabin heating circuit conduit 80. In this way, the motor circuit 56 is selectably fluidically communicable with the cabin heating circuit 58.

When the cabin heating circuit valve 88 is in the second position, the pump 86 may operate at a selected, low, flow rate to prevent the coolant flow from short circuiting the cabin heating circuit by flowing up the third conduit 84.

It will be noted that separation of the coolant flow through the cabin heating circuit 58 and the motor circuit 56 is achieved using a single valve (i.e. valve 88) which is positioned at the junction of the second motor circuit conduit 68 and the first cabin heating circuit conduit 80. When the valve 88 is positioned in the first position, coolant is directed towards the radiator 64. There is no net flow out of the cabin heating circuit 58 since there is no flow into the cabin heating circuit 58. When the valve 88 is positioned in the second position and the pump 86 is off, coolant is directed through the cabin heating circuit 58 and back into the motor circuit 56. When the valve 88 is positioned in the first position and the pump 86 is on, there is no net flow out of the second cabin heating circuit conduit 82 as noted above, however, the pump 86 generates a coolant circuit loop and drives coolant in a downstream portion 90 of the first cabin heating circuit conduit 80, through the cabin heating heat exchanger 47, and through an upstream portion 92 of the second cabin heating circuit conduit 82, whereupon the coolant is drawn back into the pump 86. Because this feature is provided using a single valve (i.e. valve 88), as opposed to using one valve at the junction of the first cabin heating circuit conduit 80 and the motor circuit 56 and another valve at the junction of the second cabin heating circuit conduit 82 and the motor circuit 56, the thermal management system 10 is made simpler and less expensive, and it further saves energy consumption by having fewer valves in the system 10 so as to reduce the energy required by the pump 70 to pump liquid through such valves.

Additionally, the valve 88 combined with the pump 86 permit isolating heated coolant in the cabin heating circuit 58 from the coolant in the motor circuit 56, thereby preventing coolant that has been heated in the cabin heating circuit heater 32 from being sent to the radiator 64 to be cooled.

A cabin heating circuit temperature sensor 94 may be provided for determining the temperature of the coolant in the cabin heating circuit 58. The temperature sensor 94 may be positioned anywhere suitable, such as downstream from the cabin heating circuit heater 32. The temperature sensor 94 may communicate with the control system 78 so that the control system 78 can determine whether or not to carry out certain actions. For example, using the temperature sensed by the temperature sensor 94, the control system 78 can determine whether the heater 32 should be activated to meet the cabin heating demands of the HVAC system 46.

The battery circuit 60 is configured for controlling the temperature of the battery packs 16a and 16b and the battery charge control module 42, which together make up the battery circuit thermal load 96. A thermal load inlet is shown at 98 upstream from the battery packs 16a and 16b and a thermal load outlet is shown at 100 downstream from the battery charge control module 42. The battery packs 16a and 16b are in parallel in the battery circuit 60, which permits the coolant flow to each of the battery packs 16a and 16b to be selected individually so that each battery pack 16a or 16b receives as much coolant as necessary to achieve a selected temperature change. It may be possible to provide a means for adjusting the flow of coolant that goes to each battery pack 16a and 16b during use of the thermal management system 10, so that the coolant flow can be adjusted to meet the instantaneous demands of the battery packs 16a and 16b. After the coolant has passed through the battery packs 16a and 16b, the coolant is brought into a single conduit which passes through the battery charge control module 42. While the battery packs 16a and 16b are shown in parallel in the battery circuit 60, they could be provided in series in an alternative embodiment.

A first battery circuit conduit 102 extends between the second motor circuit conduit 68 and the battery circuit thermal load inlet 98. A second battery circuit conduit 104 extends between the thermal load outlet 100 and the first motor circuit conduit 66. A battery circuit pump 106 may be provided for pumping coolant through the battery circuit 60 in situations where the battery circuit 60 is isolated from the motor circuit 56. A battery circuit heater 108 is provided in the first conduit 102 for heating coolant upstream from the thermal load 96 in situations where the thermal load 96 requires such heating. The battery circuit heater 108 may operate on current from a low voltage current source, such as the low voltage battery 40. This is discussed in further detail further below.

A third battery circuit conduit 110 may be provided fluidically between the second and first battery circuit conduits 102 and 104 so as to permit the flow of coolant in the battery circuit 60 to be isolated from the flow of coolant in the motor circuit 56. A chiller 112 may be provided in the third conduit 110 for cooling coolant upstream from the thermal load 96 when needed.

A battery circuit valve 114 is provided in the second conduit 104 and is positionable in a first position wherein the flow of coolant is directed towards the first motor circuit conduit 66 and in a second position wherein the flow of coolant is directed into the third battery circuit conduit 114 towards the first battery circuit conduit 102. In this way, the motor circuit 56 is selectably fluidically communicable with the battery circuit 60.

It will be noted that the flow in the battery circuit 60 is isolated from the flow in the motor circuit 56 with only one valve (i.e. valve 114). When the valve 114 is in the second position so as to direct coolant flow through the third conduit 110 into the first conduit 102, there is effectively no flow from the first motor circuit 56 through the first conduit 102 since the loop made up of the downstream portion of the first conduit 102, the thermal load 96, the second conduit 104 and the third conduit 110 is already full of coolant. By using only one valve (i.e. valve 114) to isolate the battery circuit 60, the amount of energy consumed by the pump 106 to pump coolant around the battery circuit 60 is reduced relative to a similar arrangement using two valves. Additionally, by using only one valve the battery circuit is simpler (i.e. the battery circuit has fewer components), which reduces the cost and which could increase the reliability of the battery circuit.

A battery circuit temperature sensor 116 is provided for sensing the temperature of the coolant in the battery circuit 60. The temperature sensor 116 may be positioned anywhere in the battery circuit 60, such as in the second conduit 104 downstream from the thermal load 96. The temperature from the temperature sensor 116 can be sent to the control system 78 to determine whether to have the valve 114 should be in the first or second position and whether any devices (e.g. the chiller 112, the heater 108) need to be operated to adjust the temperature of the coolant in the first conduit 102.

The main cooling circuit 62 is provided for assisting in the thermal management of the thermal loads in the HVAC system 46 and the battery circuit 60. More particularly, the thermal load in the HVAC system 46 is shown at 118 and is made up of the cabin cooling heat exchanger 48 (i.e. the evaporator 48).

The components of the main cooling circuit 62 that are involved in the cooling and management of the refrigerant flowing therein include the compressor 30 and a condenser 122. A first cooling circuit conduit 126 extends from the condenser 122 to a point wherein the conduit 126 divides into a first branch 128 which leads to the HVAC system 46 and a second branch 130 which leads to the battery circuit 60. A second cooling circuit conduit 132 has a first branch 134 (also referred to as a third branch 134) that extends from the HVAC system 46 to a joining point and a second branch 136 (also referred to as a fourth branch 136) that extends from the battery circuit 60 to the joining point. From the joining point, the second cooling circuit conduit 132 extends to the compressor 30 and from the compressor 30 to the inlet of the condenser 122.

At the downstream end of the first branch 128 of the first conduit 126 is a flow control valve 138 which controls the flow of refrigerant into the cabin cooling heat exchanger 48. The upstream end of the first branch 134 of the second conduit 132 is connected to the refrigerant outlet from the heat exchanger 48. It will be understood that the valve 138 could be positioned at the upstream end of the first branch 134 of the second conduit 132 instead. The valve 138 is controlled by the control system 78 and is opened when refrigerant flow is needed through the heat exchanger 48.

At the downstream end of the second branch 130 of the first conduit 126 is a flow control valve 140 which controls the flow of refrigerant into the battery circuit chiller 112. The upstream end of the second branch 136 of the second conduit 132 is connected to the refrigerant outlet from the chiller 112. It will be understood that the valve 140 could be positioned at the upstream end of the second branch 136 of the second conduit 132 instead. The valve 140 is controlled by the control system 78 and is opened when refrigerant flow is needed through the chiller 112.

The valves 138 and 140 may be any suitable type of valves with any suitable type of actuator. For example, they may be solenoid actuated/spring return valves. Additionally thermostatic expansion valves shown at 139 and 141 may be provided downstream from the valves 138 and 140.

A refrigerant pressure sensor 142 may be provided anywhere suitable in the cooling circuit 62, such as on the first conduit 126 upstream from where the first conduit 126 divides into the first and second branches 128 and 130. The pressure sensor 142 communicates pressure information from the cooling circuit 62 to the control system 78.

A fan shown at 144 is provided for blowing air on the radiator 64 and the condenser 122 to assist in cooling and condensing the coolant and the refrigerant respectively. The fan 144 is controlled by the control system 78.

An expansion tank 124 is provided for removing gas that can accumulate in other components such as the radiator 64. The expansion tank 124 may be positioned at the highest elevation of any fluid-carrying components of the thermal management system. The expansion tank 124 may be used as a point of entry for coolant into the thermal management system 10 (i.e. the system 10 may be filled with the coolant via the expansion tank 124).

The control system 78 is described functionally as a single unit, however the control system 78 may be made up of a plurality of units that communicate with each other and which each control one or more components of the thermal management system 10, as well as other components optionally.

The logic used by the control system 78 to control the operation of the thermal management system 10 depends on which of several states the vehicle is in. The vehicle may be on-plug and off, which means that the vehicle itself is off (e.g. the ignition key is out of its slot in the instrument panel) and is plugged into an external electrical source (e.g. for recharging the battery packs 16a and 16b). The vehicle may be off-plug and off, which means that the vehicle itself is off and is not plugged into an external electrical source. The vehicle may be off-plug and on, which means that the vehicle itself is on and is not plugged into an external electrical source. The logic used by the control system 78 may be as follows:

The control system 78 attends to the cooling requirements of the thermal load 61 of the motor circuit 56 when the vehicle is off-plug and when the vehicle is on. The control system 78 determines a maximum permissible temperature for the coolant and determines if the actual temperature of the coolant exceeds it (based on the temperature sensed by the temperature sensor 76) by more than a selected amount (which is a calibrated value, and which could be 0 for example). If so, the control system operates the pump 70 to circulate the coolant through the motor circuit 56. Initially when the vehicle enters the state of being off-plug and on, the control system 78 may default to a 'cooling off' mode wherein the pump 70 is not turned on, until the control system 78 has determined and compared the aforementioned temperature values. In the event that the vehicle is in a fault state, the control system 78 may enter a motor circuit cooling fault mode. When the control system 78 exits the fault state, the control system 78 may pass to the 'cooling off' mode.

The control system 78 attends to the heating and cooling requirements of the cabin heating circuit 58 when the vehicle is on-plug and when the vehicle is off-plug and on. The control system 78 may have 3 cabin heating modes. The control system 78 determines if the requested cabin temperature from the climate control system in the cabin 18 exceeds the temperature sensed by a temperature sensor in the evaporator 48 that senses the actual temperature in the cabin 18 by a selected calibrated amount. If so, and if the vehicle is either off plug and on or on-plug and there is sufficient power available from the electrical source, and if the control system 78 determines if the temperature sensed by the temperature sensor 76 is higher than the requested cabin temperature by a selected calibrated amount. If the temperature sensed by the temperature sensor 76 is higher, then the control system 78 positions the cabin heating circuit valve 88 in its second position wherein flow is generated through the cabin heating circuit 58 from the motor circuit 56 and the control system 78 puts the cabin heating circuit heater 32 in the off position. These settings make up the first cabin heating mode. If the temperature sensed by the temperature sensor 76 is lower than the requested cabin temperature by a selected calibrated amount, then the control system 78 positions the cabin heating circuit valve 88 in the first position and turns on the pump 86 so that flow in the cabin heating circuit 58 is isolated from flow in the motor circuit 56, and the control system 78 additionally turns on the cabin heating circuit heater 32 to heat the flow in the cabin heating circuit 58. These settings make up the second cabin heating mode.

If the temperature sensed by the temperature sensor 76 is within a selected range of the requested temperature from the climate control system then the control system 78 positions the cabin heating circuit valve 88 in the second position so that flow in the cabin heating circuit 58 is not isolated from flow in the motor circuit 56, and the control system turns the heater 32 on. These settings make up the third cabin heating mode. The selected range may be the requested temperature from the climate control system minus the selected calibrated value, to the requested temperature from the climate control system plus the selected calibrated value.

The default state for the control system 78 when cabin heating is initially requested may be to use the first cabin heating mode.

The control system 78 may have one cabin cooling mode. The control system 78 determines if the actual temperature of the evaporator 48 is lower than the target temperature of the evaporator 48 by more than a calibrated amount. If so, and if the vehicle is either off plug and on or on-plug and there is sufficient power available from the electrical source, then the control system 78 turns on the compressor 30 and moves the refrigerant flow control valve 138 to the open position so that refrigerant flows through the cabin cooling heat exchanger 48 to cool an air flow that is passed into the cabin 18.

The thermal management system 10 will enter a cabin heating and cabin cooling fault mode when the vehicle is in a fault state.

When the climate control system in the cabin 18 is set to a 'defrost' setting, the control system 78 will enter a defrost mode, and will return to whichever heating or cooling mode the control system 78 was in once defrost is no longer needed.

The default mode for the control system 78 with respect to the cabin heating circuit 58 may be to have the cabin heating circuit valve 88 in the first position to direct flow towards the radiator, and to have the heater 32 off, the pump 86 off. The default mode for the control system 78 with respect to cooling the cabin 18 may to be to have the refrigerant flow control valve 138 in the closed position to prevent refrigerant flow through the cabin cooling heat exchanger 48, and to have the compressor 30 off.

The control system 78 attends to the heating and cooling requirements of the battery circuit 60 when the vehicle is on-plug and is off, and when the vehicle is off-plug and is on. The control system 78 may have three cooling modes for cooling the battery circuit thermal load 96. The control system 78 determines a desired battery pack temperature based on the particular situation, and determines if a first cooling condition is met, which is whether the desired battery pack temperature is lower than the actual battery pack temperature by a first selected calibrated amount. If the first cooling condition is met, the control system 78 determines which of the three cooling modes the control system 78 will operate in by determining which, if any, of the following second and third cooling conditions are met. The second condition is whether the temperature sensed by the temperature sensor 76 is lower than the desired battery pack temperature by a second selected calibrated amount, which may, for example, be related to the expected temperature rise that would be incurred in the flow of coolant from the temperature sensor 76 to the battery circuit thermal load 96. If the second condition is met, then the control system 78 operates in a first battery circuit cooling mode, wherein the control system 78 positions the battery circuit valve 114 in the second position wherein flow is generated through the battery circuit 60 from the motor circuit 56 and the control system 78 puts the refrigerant flow control valve 140 in the closed position preventing refrigerant flow through the chiller 112.

The third cooling condition is whether the temperature sensed by the temperature sensor 76 is greater than the desired battery pack temperature by at least a third selected calibrated amount, which may, for example, be related to the expected temperature drop associated with the chiller 112. If the third cooling condition is met, then the control system 78 operates in a second battery circuit cooling mode wherein the control system 78 positions the battery circuit valve 114 in the first position and turns on the pump 106 so that flow in the battery circuit 60 is isolated from flow in the motor circuit 56, and the control system 78 additionally positions the flow control valve 140 in the open position so that refrigerant flows through the chiller 112 to cool the flow in the battery circuit 60.

If neither the second or third cooling conditions are met, (i.e. if the temperature sensed by the temperature sensor 76 is greater than or equal to the desired battery pack temperature minus the second selected calibrated amount and the temperature sensed by the temperature sensor 76 is less than or equal to the desired battery pack temperature plus the third selected calibrated amount, then the control system 78 operates in a third battery circuit cooling mode wherein the control system 78 positions the battery circuit valve 114 in the second position so that flow in the battery circuit 60 is not isolated from flow in the motor circuit 56, and the control system 78 turns the chiller 112 on.

It will be understood that in any of the battery circuit cooling modes, the control system 78 turns the battery circuit heater 108 off.

The default state for the control system 78 when battery circuit thermal load cooling is initially requested may be to use the first battery circuit cooling mode.

The control system 78 may have three battery circuit heating modes. The control system 78 determines a desired battery circuit thermal load temperature based on the particular situation, and determines whether a first heating condition is met, which is whether the desired battery pack temperature is higher than the actual battery pack temperature by a first selected calibrated amount. If the first heating condition is met, the control system 78 determines which of the three heating modes the control system 78 will operate in by determining which, if any, of the following second and third heating conditions are met. The second heating condition is whether the temperature sensed by the temperature sensor 76 is higher than the desired battery pack temperature by a second selected calibrated amount that may, for example, be related to the expected temperature drop of the coolant as the coolant flows from the temperature sensor 76 to the battery circuit thermal load 96. If the second condition is met, then the control system 78 operates in a first battery circuit heating mode, wherein it positions the battery circuit valve 114 in the second position wherein flow is generated through the battery circuit 60 from the motor circuit 56 and the control system 78 turns the battery circuit heater 32 off.

The third heating condition is whether the temperature sensed by the temperature sensor 76 is lower than the desired battery pack temperature by at least a third selected calibrated amount, which may, for example, be related to the expected temperature rise associated with the battery circuit heater 108. If this third heating condition is met, then the control system 78 operates in a second battery circuit heating mode wherein the control system 78 positions the battery circuit valve 114 in the first position and turns on the pump 106 so that flow in the battery circuit 60 is isolated from flow in the motor circuit 56, and the control system 78 additionally turns on the battery circuit heater 108 to heat the flow in the battery circuit 60.

If neither the second or third conditions are met, (i.e. if the temperature sensed by the temperature sensor 76 is less than or equal to the desired battery pack temperature plus the second selected calibrated amount and the temperature sensed by the temperature sensor 76 is greater than or equal to the desired battery pack temperature minus the third selected calibrated amount, then the control system 78 operates in a third battery circuit heating mode wherein the control system 78 positions the battery circuit valve 114 in the second position so that flow in the battery circuit 60 is not isolated from flow in the motor circuit 56, and the control system 78 turns the battery circuit heater 108 on.

The default state for the control system 78 when battery circuit thermal load heating is initially requested may be to use the first battery circuit heating mode.

The thermal management system 10 will enter a battery circuit heating and cooling fault mode when the vehicle is in a fault state.

When the vehicle is off-plug, the control system 78 heats the battery circuit thermal load 96 using only the first battery circuit heating mode.

The default state for the control system 78 when the vehicle is turned on is to position the battery circuit valve 114 in the first position so as to not generate coolant flow through the battery circuit 60.

The control system 78 may operate using several other rules in addition to the above. For example the control system 78 may position the radiator bypass valve 75 in the first position to direct coolant flow through the radiator 64 if the temperature of the coolant sensed at sensor 76 is greater than the maximum acceptable temperature for the coolant plus a selected calibrated value and the cabin heating circuit valve 88 is in the first position and the battery circuit valve 114 is in the first position.

The control system 78 may also position the radiator bypass valve 75 in the first position to direct coolant flow through the radiator 64 if the temperature of the coolant sensed at sensor 76 has risen to be close to the maximum acceptable temperature for the coolant plus a selected calibrated value and the cabin heating circuit valve 88 is in the second position and the battery circuit valve 114 is in the second position.

In the event of an emergency battery shutdown, the control system 78 will shut off the compressor 30 and will turn on the cabin heating circuit heater 32 so as to bleed any residual voltage.

The temperature of the battery packs 16*a* and 16*b* may be maintained above their minimum required temperatures by the control system 78 through control of the refrigerant flow control valve 140 to the chiller 112. The temperature of the evaporator may be maintained above a selected temperature which is a target temperature minus a calibrated value, through opening and closing of the refrigerant flow control valve 138. The speed of the compressor 30 will be adjusted based on the state of the flow control valve 140 and of the flow control valve 138.

The control system 78 is programmed with the following high level objectives and strategies using the above described modes. The high level objectives include:

A. control the components related to heating and cooling of the battery circuit thermal load 96 to maintain the battery packs 16a and 16b and the battery charge control module 42 within the optimum temperature range during charging and vehicle operation;

B. maintain the motor 14, the transmission control system 28 and the DC/DC converter 34 at their optimum temperature ranges;

C. control the components related to heating and cooling the cabin 18 based on input from the climate control system; and D. operate with a goal of maximizing vehicle range while meeting vehicle system requirements.

The control system 78 uses the following high level strategy on-plug:

When the vehicle is on-plug and is off, the control system 78 pre-conditions the battery packs 16a and 16b if required. Pre-conditioning entails bringing the battery packs 16a and 16b into a temperature range wherein the battery packs 16a and 16b are able to charge more quickly.

Figure 3:
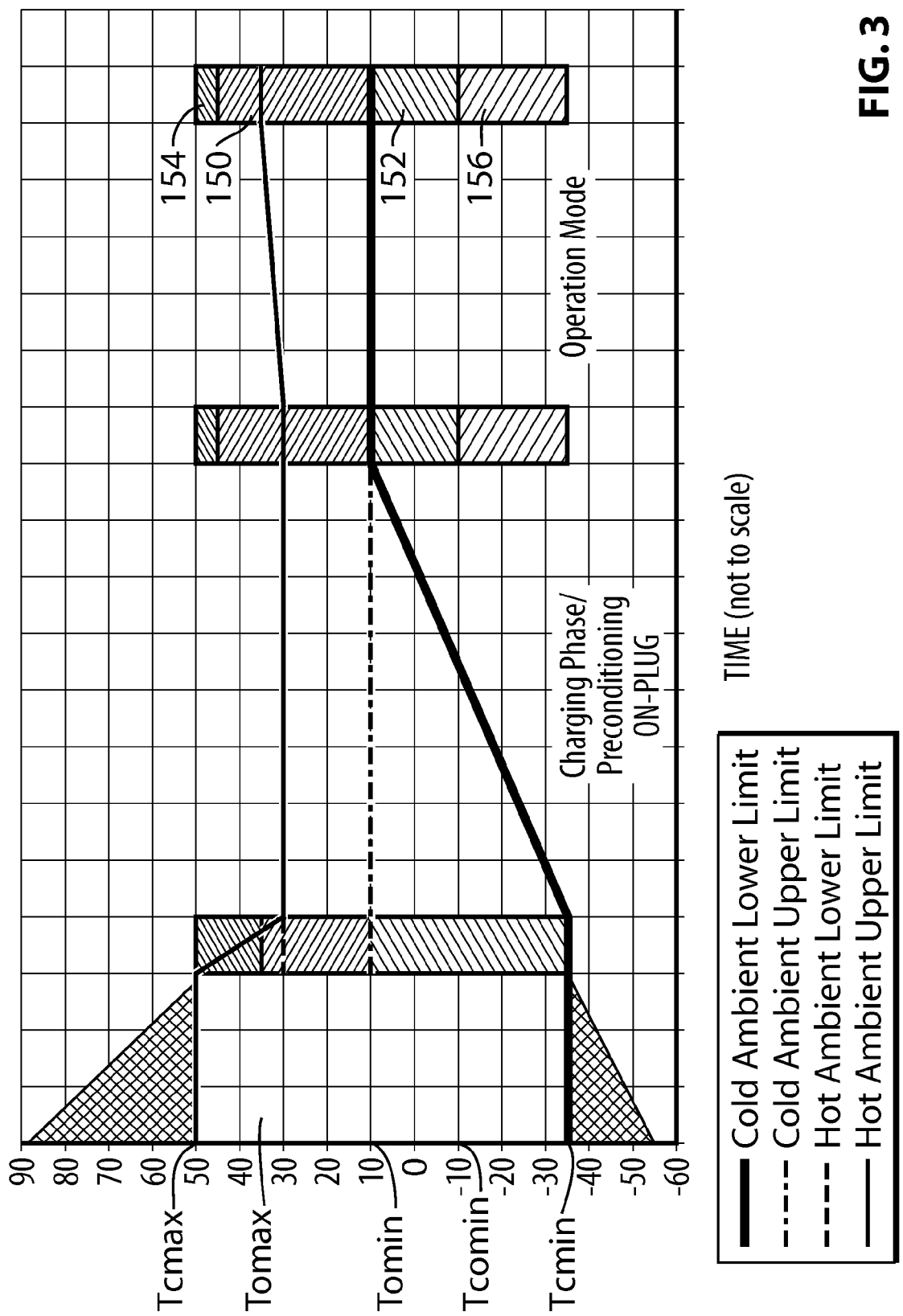
FIG. 3 is a graph of the temperature of battery packs that are part of the electric vehicle shown in FIG. 1.

The control system 78 determines the amount of power available from the electrical source for temperature control of the battery packs 16a and 16b, which is used to determine the maximum permitted compressor speed, maximum fan speed or the battery pack heating requirements depending on whether the battery packs 16a and 16b require cooling or heating. A calibratible hysteresis band will enable the battery pack temperature control to occur in a cyclic manner if the battery pack temperatures go outside of the selected limits (which are shown in FIG. 3). If sufficient power is available from the electrical source, the battery packs 16a and 16b may be charged while simultaneously being conditioned (i.e. while simultaneously being cooled or heated to remain within their selected temperature range). If the battery packs 16a and 16b reach their fully charged state, battery pack conditioning may continue, so as to bring the battery packs 16a and 16b to their selected temperature range for efficient operation.

When the vehicle is on-plug the battery circuit heater 108 may be used to bring the battery packs 16a and 16b up to a selected temperature range, as noted above. In one of the heating modes described above for the battery circuit 60, the battery circuit valve 114 is in the second position so that the flow in the battery circuit 60 is isolated from the flow in the motor circuit 56, and therefore the battery circuit heater 108 only has to heat the coolant in the battery circuit 60.

The cabin may be pre-conditioned (i.e. heated or cooled while the vehicle is off) when the vehicle is on-plug and the state of charge of the battery packs 16a and 16b is greater than a selected value.

If the vehicle is started while on-plug, the control system 78 may continue to condition the battery packs 16a and 16b, to cool the motor circuit thermal load 61 and use of the HVAC system 46 for both heating and cooling the cabin 18 may be carried out.

When the vehicle is off-plug, battery pack heating may be achieved solely by using the heat in the coolant from the motor circuit (i.e. without the need to activate the battery circuit heater 108). Thus, while the vehicle is off-plug and on and the battery packs 16a and 16b require heating, the battery circuit valve 114 may be in the first position so that the battery circuit 60 is not isolated from the motor circuit 56. Some flow may pass through the third battery circuit conduit 110 for flow balancing purposes, however the refrigerant flow to the chiller 112 is prevented while the battery packs 16a and 16b require heating. By using low-voltage battery circuit heaters instead of high-voltage heaters for the heaters 108, a weight-savings is achieved which thereby extends the range of the vehicle.

When the vehicle is off-plug, battery pack cooling may be achieved by isolating the battery circuit 60 from the motor circuit 56 by moving the battery circuit valve 114 to the second position and by opening the flow of refrigerant to the chiller 112 by moving the flow control valve 140 to its open position, and by running the compressor 30, as described above in one of the three cooling modes for the battery circuit 60.

It will be noted that the battery packs 16a and 16b may sometimes reach different temperatures during charging or vehicle operation. The control system 78 may at certain times request isolation of the battery circuit 60 from the motor circuit 56 and may operate the battery circuit pump 106 without operating the heater 108 or permitting refrigerant flow to the chiller 112. This will simply circulate coolant around the battery circuit 60 thereby balancing the temperatures between the battery packs 16a and 16b.

Reference is made to FIG. 3, which shows a graph of battery pack temperature vs. time to highlight several of the rules which the control system 78 (FIG. 2) follows. In situations where the vehicle is on-plug and the battery packs 16a and 16b are below a selected minimum charging temperature Tcmin (FIG. 3), the control system 78 will heat the battery packs 16a and 16b prior to charging them. Once the battery packs 16a and 16b reach the minimum charging temperature Tcmin, some of the power from the electrical source may be used to charge the battery packs 16a and 16b, and some of the power from the electrical source may continue to be used to heat them. When the battery packs 16a and 16b reach a minimum charge only temperature Tcomin, the control system 78 may stop using power from the electrical source to heat the battery packs 16a and 16b and may thus use all the power from the electrical source to charge them. Tcmin may be, for example, −35 degrees Celsius and Tcomin may be, for example, −10 degrees Celsius.

While charging, the control system 78 may precondition the battery packs 16a and 16b for operation of the vehicle. Thus, the control system 78 may bring the battery packs 16a and 16b to a desired minimum operating temperature Tomin while on-plug and during charging.

In situations where the vehicle is on-plug and the battery packs 16a and 16b are above a selected maximum charging temperature Tcmax, the control system 78 will cool the battery packs 16a and 16b prior to charging them. Once the battery packs 16a and 16b come down to the maximum charging temperature Tcmax power from the electrical source may be used to charge them, while some power may be required to operate the compressor 30 and other components in order to maintain the temperatures of the battery packs 16a and 16b below the temperature Tcmax. Tcmax may be, for example, 30 degrees Celsius.

The battery packs 16a and 16b may have a maximum operating temperature Tomax that is the same or higher than the maximum charging temperature Tcmax. As such, when the battery packs 16a and 16b are cooled sufficiently for charging, they are already pre-conditioned for operation. In situations where the maximum operating temperature Tomax is higher than the maximum charging temperature Tcmax, the temperatures of the battery packs 16a and 16b may be permitted during operation after charging to rise from the temperature Tcmax until they reach the temperature Tomax.

The maximum and minimum operating temperatures Tomax and Tomin define an example operating range for the battery packs 16a and 16b. In situations where the battery packs 16a and 16b are below minimum operating temperature or above their maximum operating temperature, the vehicle may still be used to some degree. Within selected first ranges shown at 150 and 152 (based on the nature of the battery packs 16a and 16b) above and below a selected operating range the vehicle may still be driven, but the power available will be somewhat limited. Within selected second ranges shown at 154 and 156 above and below the selected first ranges 150 and 152, the vehicle may still be driven in a limp home mode, but the power available will be more severely limited. Above and below the selected second ranges, the battery packs 16a and 16b cannot be used. The lower first range 150 may be between about 10 degrees Celsius and about −10 degrees Celsius and the upper first range 152 may be between about 35 degrees Celsius and about 45 degrees Celsius. The lower second range 154 may be between about −10 degrees Celsius and about −35 degrees Celsius. The upper second range may be between about 45 degrees Celsius and about 50 degrees Celsius.

It will be noted that the pumps 70, 86 and 106 are variable flow rate pumps. In this way they can be used to adjust the flow rates of the coolant through the motor circuit 56, the cabin heating circuit 58 and the battery circuit 60. By controlling the flow rate generated by the pumps 70, 86 and 106, the amount of energy expended by the thermal management system 10 can be adjusted in relation to the level of criticality of the need to change the temperature in one or more of the thermal loads.

Additionally, the compressor 30 is also capable of variable speed control so as to meet the variable demands of the HVAC system 46 and the battery circuit 60.

Throughout this disclosure, the control system 78 is referred to as turning on devices (e.g. the battery circuit heater 108, the chiller 112), turning off devices, or moving devices (e.g. valve 88) between a first position and a second position. It will be noted that, in some situations, the device will already be in the position or the state desired by the control system 78, and so the control system 78 will not have to actually carry out any action on the device. For example, it may occur that the control system 78 determines that the chiller heater 108 needs to be turned on. However, the heater 108 may at that moment already be on based on a prior decision by the control system 78. In such a scenario, the control system 78 obviously does not actually 'turn on' the heater 108, even though such language is used throughout this disclosure. For the purposes of this disclosure and claims, the concepts of turning on, turning off and moving devices from one position to another are intended to include situations wherein the device is already in the state or position desired and no actual action is carried out by the control system on the device.

Figure 4:
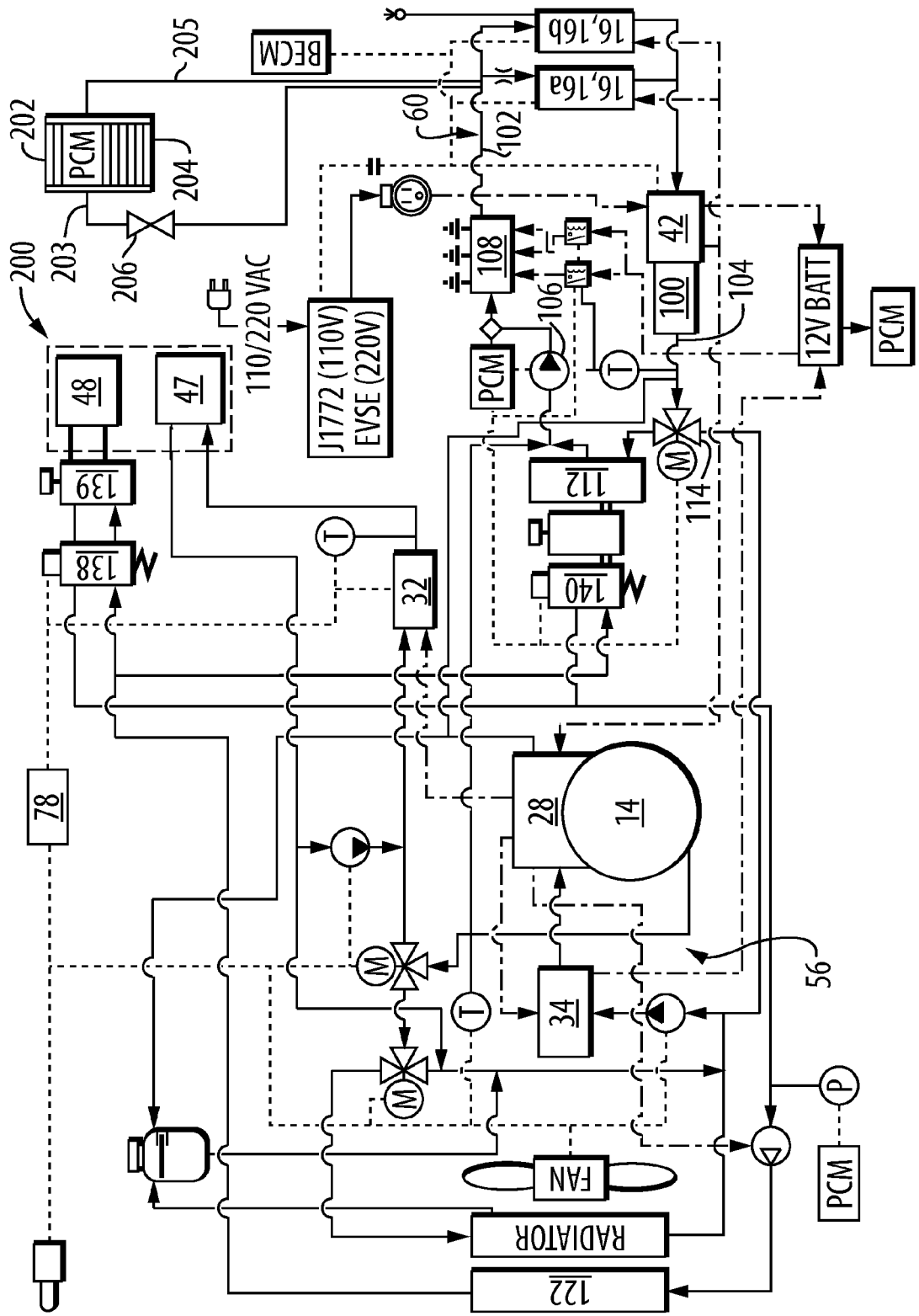
FIG. 4 is a schematic illustration of a thermal management system for the electric vehicle including a phase-change material module containing a phase-change material for a battery circuit.

Reference is made to FIG. 4, which shows a thermal management system 200. Some differences, where they exist, are described below. The primary difference between the thermal management system 200 and the thermal management system 10 is that the thermal management system 200 includes a phase-change material module 202 that is connected to the battery circuit 60 via first and second phase-change material module conduits 203 and 205 (which may be referred to as phase-change material module inlet and outlet conduits). The phase-change material module 202 contains a phase-change material 204 and is a heat exchanger for heat exchange between the phase-change material 204 and the coolant passing through the module 202. The phase-change material module 202 may have any suitable structure. For example, it may be a shell-and-tube heat exchanger, wherein the phase-change material 204 is positioned in the body of the heat exchanger and performs a heat exchange with coolant flowing through the tubes. The phase-change material 204 may itself make up the body of the heat exchanger and may simply have flow passages therethrough so that the phase-change material 204 is in direct contact with the coolant itself. To achieve this, the phase-change material 204 may itself be held in a matrix that holds and encloses the phase-change material even when the phase-change material is in the liquid phase or solid phase. The matrix may be any suitable material, such as graphite. Fins made from a highly conductive material such as copper may pass from within the matrix and phase-change material structure to the outside of the phase-change material/matrix structure, can improve the heat transfer to and from phase-change material 204 that is buried within the structure. Microchannels through the structure may also be provided to assist in augmenting heat transfer to and from the phase-change material 204.

Phase-change materials generally offer the advantage of absorbing a relatively large amount of heat (or more broadly, permitting the transfer or a large amount of heat in or out) while maintaining a constant temperature during their phase change. Additionally, they change temperature relatively linearly and predictably after the phase change. The phase-change material 204 may be any suitable type of phase-change material, such as a positive temperature organic phase-change material or a hydrated salt phase-change material. A suitable phase-change material 204 for use in maintaining the temperature of the battery packs 16 may have a transition temperature of about 25 degrees Celsius.

A phase-change material module flow control valve 206 controls the flow of coolant through the phase-change material module 202. This control may optionally be based at least in part on the temperature of the coolant in relation to the transition temperature of the phase-change material 204. The phase-change material module flow control valve 206 may be positioned in the first phase-change material module conduit 203. The phase-change material module flow control valve 206 may be positionable in at least two positions by the control system 78, including an open position and a closed position. In the open position the valve 206 directs coolant flow from the conduit 102 into the conduit 203, through the phase-change material module 202, through the conduit 205, and back into the conduit 102. In the closed position the valve 206 directs coolant through the conduit 102 while preventing flow through the phase-change material module 202. Alternatively, the valve 206 may be positioned in the second phase-change material module conduit 205 with equal effect.

When the vehicle 12 is on-plug, the control system 78 may precondition the battery packs 16 using the heater 108. Additionally, the valve 206 may be positioned to divert flow through the phase-change material module 202 to heat the phase-change material 204 so that the phase-change material 204 is in a liquid state and ready for use.

When the vehicle 12 is started up and is taken off plug, the coolant flow is prevented through the phase-change material 204 initially. If the battery packs 16 are below a selected temperature and the vehicle 12 is on, the control system 78 may first determine whether the coolant from the motor circuit 56 is sufficiently hot to heat the battery packs 16 to their selected temperature. If so, then the control system 78 may direct that coolant to the battery circuit 60 to heat the battery packs 16, while keeping the flow control valve 206 closed.

If the temperature of the coolant in the motor circuit 56 is lower than the temperature of the battery packs 16, the control system 78 may isolate the battery circuit 60 using the flow control valve 114, start the battery circuit pump 106, and open the phase-change material flow control valve 206 to permit coolant to flow through the phase-change material module 202 to warm the coolant up so that the coolant in turn warms up the battery packs 16. Such a situation could occur, for example, when driving on a cold day. If at some point during the trip being made with the vehicle 12, the temperature of the coolant in the motor circuit 56 increases sufficiently through heat generated by the motor 14, the transmission control system 28 and the DC/DC converter 34, then the control system 78 may reposition valves 114 and 206 to direct flow into the battery circuit 60 from the motor circuit 56 and prevent flow through the phase-change material module 202 respectively.

If the temperature of the coolant in the motor circuit 56 is higher than the temperature of the battery packs 16 but is not high enough to bring the battery packs 16 to their desired temperatures, the control system 78 may still direct flow to the battery circuit 60 from the motor circuit 56 to gain at least some benefit from the waste energy from the motor circuit thermal load. Additionally, the phase-change material flow control valve 206 may be opened so that the phase-change material 204 heats the coolant the rest of the way to a desired temperature so that the coolant can then pass through the battery packs 16 to heat them to a desired temperature.

In the two latter cases where the phase-change material 204 is used, if the phase-change material 204 does not deplete itself by the time the coolant temperature in the motor circuit 56 is high enough for the coolant to take over the task of heating the battery packs 16 to their selected temperature, the vehicle 12 will avoided entirely the use of the heater 108 during the period where the motor circuit thermal load is warming up the coolant in the motor circuit 56. This reduces the energy consumption of the vehicle 12, thereby extending the range of the vehicle 12 (or at least the electric-only range of the vehicle 12 in embodiments wherein there is no internal combustion engine).

In the two latter cases, if the phase-change material 204 is depleted (or reaches some selected level of depletion) before the battery packs 16 reach their desired temperature and the temperature of the coolant in the motor circuit 56 is not yet high enough to heat the battery packs 16 to their desired temperatures, then the heater 108 may be used to heat the coolant, and valve 114 may be operated to isolate the battery circuit 60 from the motor circuit 56 if the battery circuit 60 was not already isolated. It will be understood however, that this still results in a reduction in the energy consumption of the vehicle 12 even though at some point during that warm-up period the heater 108 may be used.

The phase-change material module 202 is shown in FIG. 4 as being connected via conduits 203 and 205 to the conduit 102 from the battery circuit 60. It is alternatively possible for the phase-change material module 202 to be connected via conduits 203 and 205 to the battery circuit conduit 104.

If there is some other source of heat for returning the phase-change material 204 to a liquid state when the vehicle 12 is on-plug, then it may be possible in some embodiments to eliminate the battery circuit heater 108. Alternatively, it may be possible to reduce the size of the battery circuit heater 108 relative to an embodiment that does not include the phase-change material module 202, since, if need be the phase-change material module 202 and the heater 108 could operate together to achieve a certain amount of heating performance to handle extreme conditions that would otherwise have had to be handled by the heater 108 alone.

Figure 5:
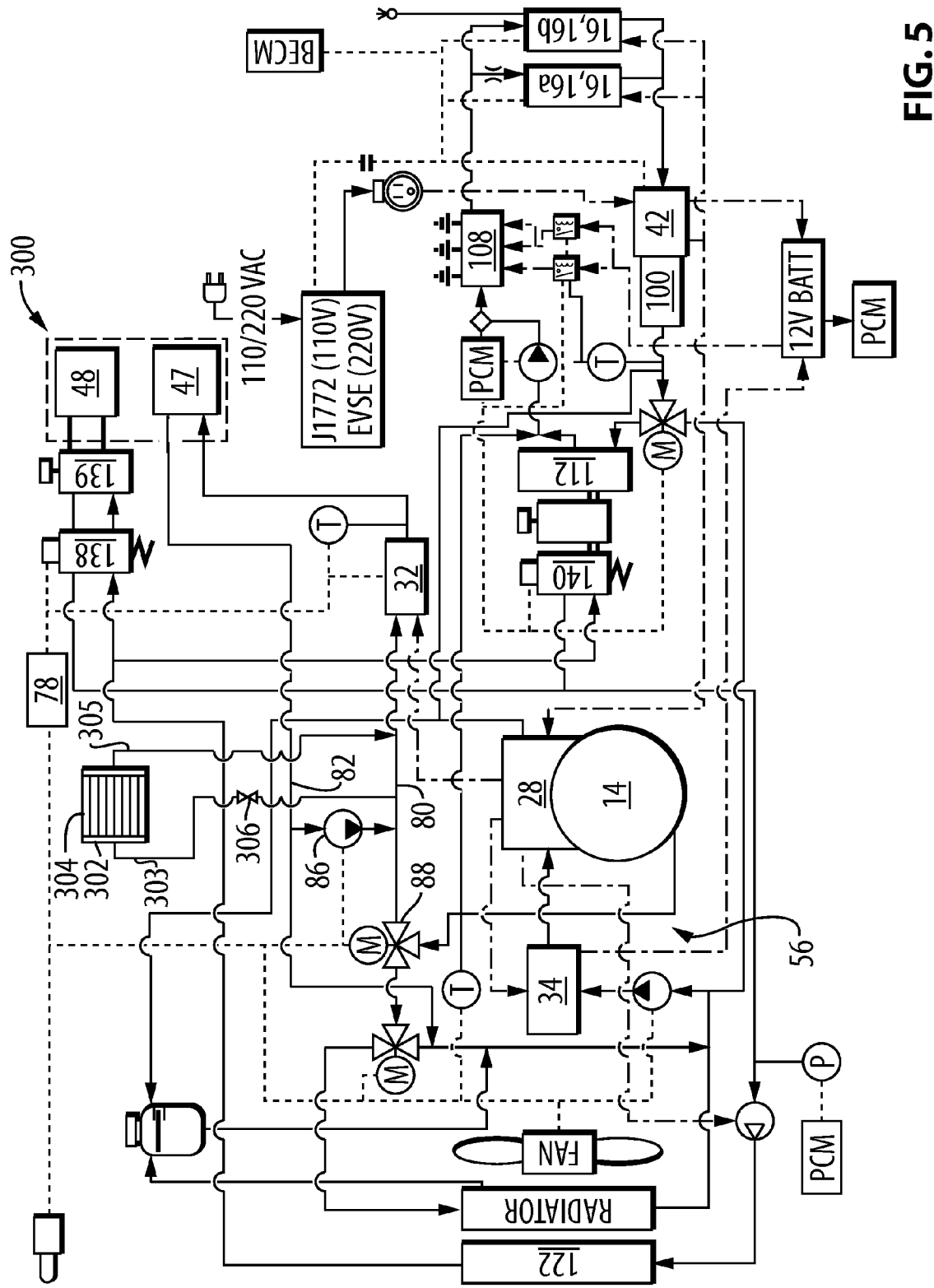
FIG. 5 is a schematic illustration of a thermal management system for the electric vehicle including a phase-change material module containing a phase-change material for a cabin heating circuit.

Reference is made to FIG. 5, which shows a thermal management system 300 that may be similar to the thermal management system 200 except that the thermal management system 300 has a phase-change material module 302 which contains a phase-change material 304 and which is connected to the cabin heating circuit 58 via first and second phase-change material module conduits 303 and 305 (which may be referred to as inlet and outlet phase-change material module conduits). The phase-change material module 302 may have any suitable structure, such as a structure similar to that of phase-change material module 202. The transition temperature for the phase-change material 304 may be any suitable selected temperature such as, for example, 85 degrees Celsius.

A phase-change material module flow control valve 306 controls the flow of coolant through the phase-change material module 302. This control may optionally be based at least in part on the temperature of the coolant in relation to the transition temperature of the phase-change material 304. The phase-change material module flow control valve 306 may be positioned at the junction of the first phase-change material module conduit 303 and the cabin circuit conduit 80 or the junction of the second phase-change material module conduit 305 and the cabin circuit conduit 80 and may be similar to the valve 206 in FIG. 5.

When the vehicle 12 is on-plug, the control system 78 may precondition the cabin 18 using the heater 32, and may also position the flow control valve 306 to send coolant flow through the phase-change material module 302 so that the heated coolant heats the phase-change material 304 to bring the phase-change material 304 to a liquid state and ready for use.

When the vehicle 12 is started up and is taken off plug, the coolant flow is prevented through the phase-change material 304 initially. If heating of the cabin 18 is needed or requested and the vehicle 12 is on, the control system 78 may first determine whether the coolant from the motor circuit 56 is sufficiently hot to heat the cabin 18 to the selected temperature. If so, then the control system 78 may direct that coolant to the heater core 47 to heat the cabin 18, while positioning the flow control valve 306 to prevent coolant flow through the phase-change material module 302.

If the temperature of the coolant in the motor circuit 56 is lower than the temperature of the cabin 18, the control system 78 may isolate the cabin circuit 58 using the flow control valve 88, start the cabin circuit pump 86, and open the phase-change material flow control valve 306 to permit coolant to flow through the phase-change material module 302 to warm the coolant up. As a result, when the coolant subsequently passes through the heater core 47, it is useful for heating the cabin 18. If at some point during the trip being made with the vehicle 12, the temperature of the coolant in the motor circuit 56 increases sufficiently through heat generated by the motor 14, the transmission control system 28 and the DC/DC converter 34, then the control system 78 may reposition valves 88 and 306 to direct flow into the battery circuit 60 from the motor circuit 56 and prevent flow through the phase-change material module 302 respectively.

If the temperature of the coolant in the motor circuit 56 is higher than the temperature of the battery packs 16 but is not high enough to bring the cabin 18 to the desired temperature, the control system 78 may still direct flow to the heater core 47 from the motor circuit 56 to gain at least some benefit from the waste energy from the motor circuit thermal load. Additionally, the phase-change material module flow control valve 306 may be opened so that the phase-change material 304 heats the coolant the rest of the way to a desired temperature so that the coolant can then pass through the battery packs 16 to heat them to a desired temperature.

Similarly to the embodiment shown in FIG. 4, in the two latter cases, if the phase-change material 304 does not deplete itself by the time the coolant temperature in the motor circuit 56 is high enough for the coolant to take over the task of heating the cabin 18 to the selected temperature, the vehicle 12 will avoided entirely the use of the heater 32 during the period where the motor circuit thermal load is warming up the coolant in the motor circuit 56. This reduces the energy consumption of the vehicle 12, thereby extending the range of the vehicle 12 (or at least the electric-only range of the vehicle 12 in embodiments wherein there is no internal combustion engine).

In the two latter cases, if the phase-change material 304 is depleted (or reaches some selected level of depletion) before the battery packs 16 reach their desired temperature and the temperature of the coolant in the motor circuit 56 is not yet high enough to heat the cabin 18 to the desired temperatures, then the heater 32 may be used to heat the coolant, and valve 88 may be operated to isolate the battery circuit 60 from the motor circuit 56 if the battery circuit 60 was not already isolated. It will be understood however, that this still results in a reduction in the energy consumption of the vehicle 12 even though at some point during that warm-up period the heater 32 may be used.

The phase-change material module 302 is shown as being connected via conduits 303 and 305 to the conduit 80. It is alternatively possible for the phase-change material module 302 to be connected via conduits 303 and 305 to the cabin circuit conduit 82.

If there is some other source of heat for returning the phase-change material 304 to a liquid state when the vehicle 12 is on-plug, then it may be possible in some embodiments to eliminate the cabin circuit heater 32. Alternatively, it may be possible to reduce the size of the cabin circuit heater 32 relative to an embodiment that does not include the phase-change material module 302, since, if need be the phase-change material module 302 and the heater 32 could operate together to achieve a certain amount of heating performance to handle extreme conditions that would otherwise have had to be handled by the heater 32 alone.

Figure 6:
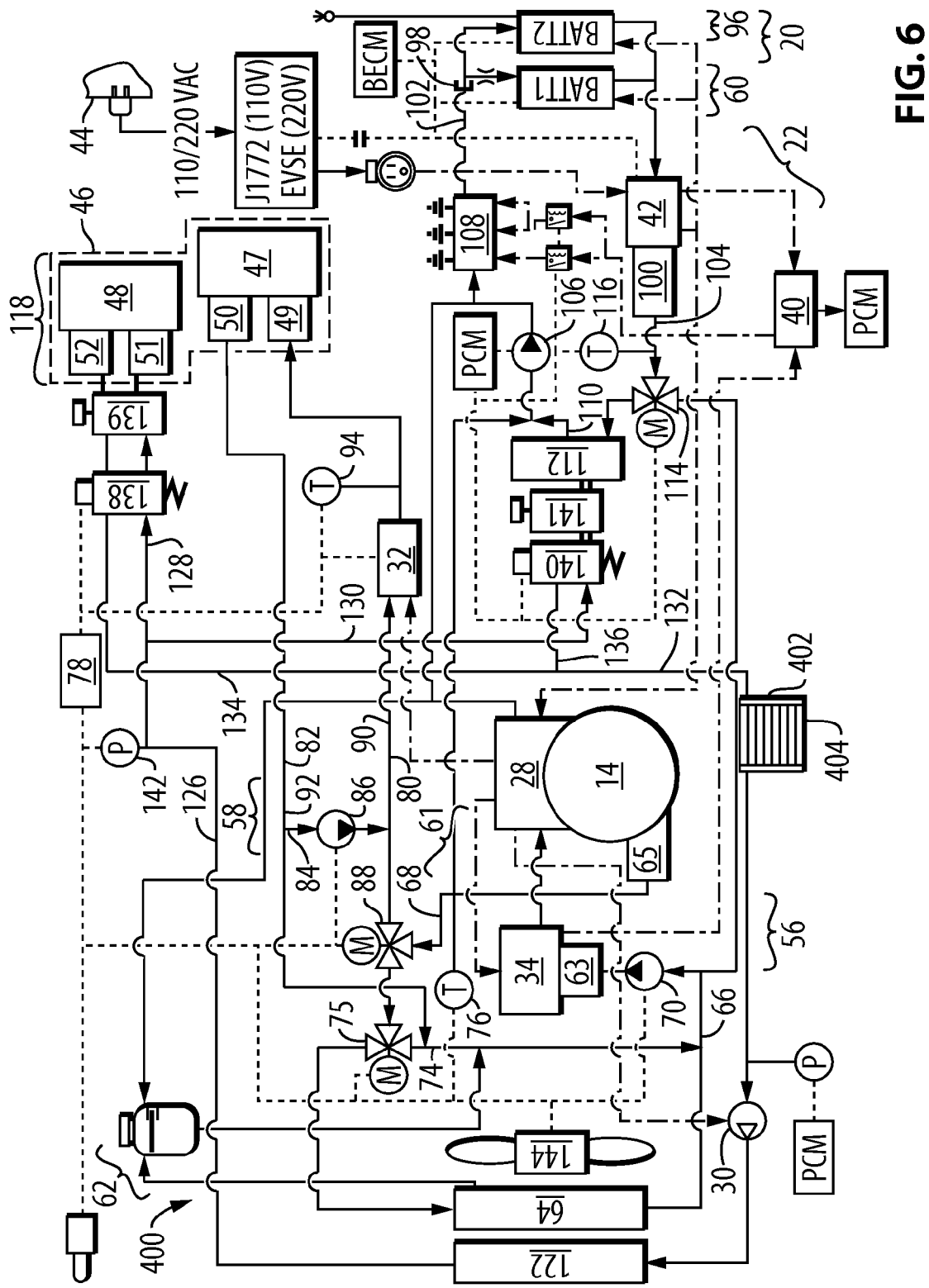
FIG. 6 is a schematic illustration of a thermal management system for the electric vehicle including a phase-change material module containing a phase-change material for a cooling circuit.

Reference is made to FIG. 6, which shows a thermal management system 400 that may be similar to the thermal management systems 200 and 300 except that the thermal management system 400 has a phase-change material module 402 used to assist in cooling the cabin 18. The phase-change material module 402 may, for example, be a heat exchanger positioned in-line in the conduit 132 downstream from the evaporator 48 and the chiller 112 and upstream from the compressor 30. The phase-change material module 402 may have any suitable structure that is configured to facilitate heat exchange between the phase-change material 404 and a flow of refrigerant. The transition temperature for the phase-change material 402 may be any suitable selected temperature such as, for example, 0 degrees Celsius.

When the vehicle 12 is on-plug, the control system 78 may recharge spent phase-change material 404 in the phase-change material module 402. To carry this out, the control system 78 may turn the compressor 30 and the fan 144 on and may open the valve 138, so that refrigerant is compressed and condensed, and is sent through the thermal expansion valve 139 for expansion and thus cooling. The refrigerant will then pass through the evaporator 48. An air flow will be provided by the HVAC system so as to inhibit ice formation on the evaporator 48 but the air flow will be selected to be relatively low so as to reduce any heating of the refrigerant passing through the evaporator 48. After passing through the evaporator 48, the refrigerant is transported to the phase-change control module 402 where the refrigerant can then recharge the phase-change material 404. From there the refrigerant is sent to the compressor 30. Additionally, when the vehicle 12 is on-plug, the control system 78 may precondition the cabin 18 and the battery pack using the cooling circuit 62. In an alternative embodiment, the phase-change material module 402 may be positioned between the thermal expansion valve 138 and the evaporator 48 so that the phase-change material module 402 can be recharged by the refrigerant upstream from the evaporator 48 so that the refrigerant entering the evaporator 48 has potentially been heated somewhat during recharging of the phase-change material 404 and is therefore less likely to cause ice formation in the evaporator 48.

In yet another embodiment, phase-change material could be used as an internal heat exchanger (IHX), contacting both the suction and liquid lines.

When the vehicle 12 is started up and is taken off plug, the compressor 30 is turned off initially. If cooling of the cabin 18 or battery packs 16 is needed at some point during usage of the vehicle 12, the control system 78 may start up the compressor 30, and open whichever of the valves 138 and 140 is necessary. As the refrigerant flows from the evaporator 48 and/or chiller 112 through the phase-change material module 402 the refrigerant is cooled prior to entry into the compressor 30. Because the refrigerant flow at the inlet of the condenser 122 has a lower temperature than the refrigerant flow would have without the presence of the phase-change material module 402, the compressor 30 has relatively less work to do to compress the refrigerant flow to a certain pressure, and thereby consumes less energy in doing such compression on the refrigerant. A reduction in energy consumed by the compressor 30 can result in increased range for the vehicle 12.

While the phase-change material modules 202, 302 and 402 have been shown in individual embodiments, it will be noted that an embodiment could be provided in which all three phase-change material modules 202, 302 and 402 are present in the thermal management system.

Figure 7:
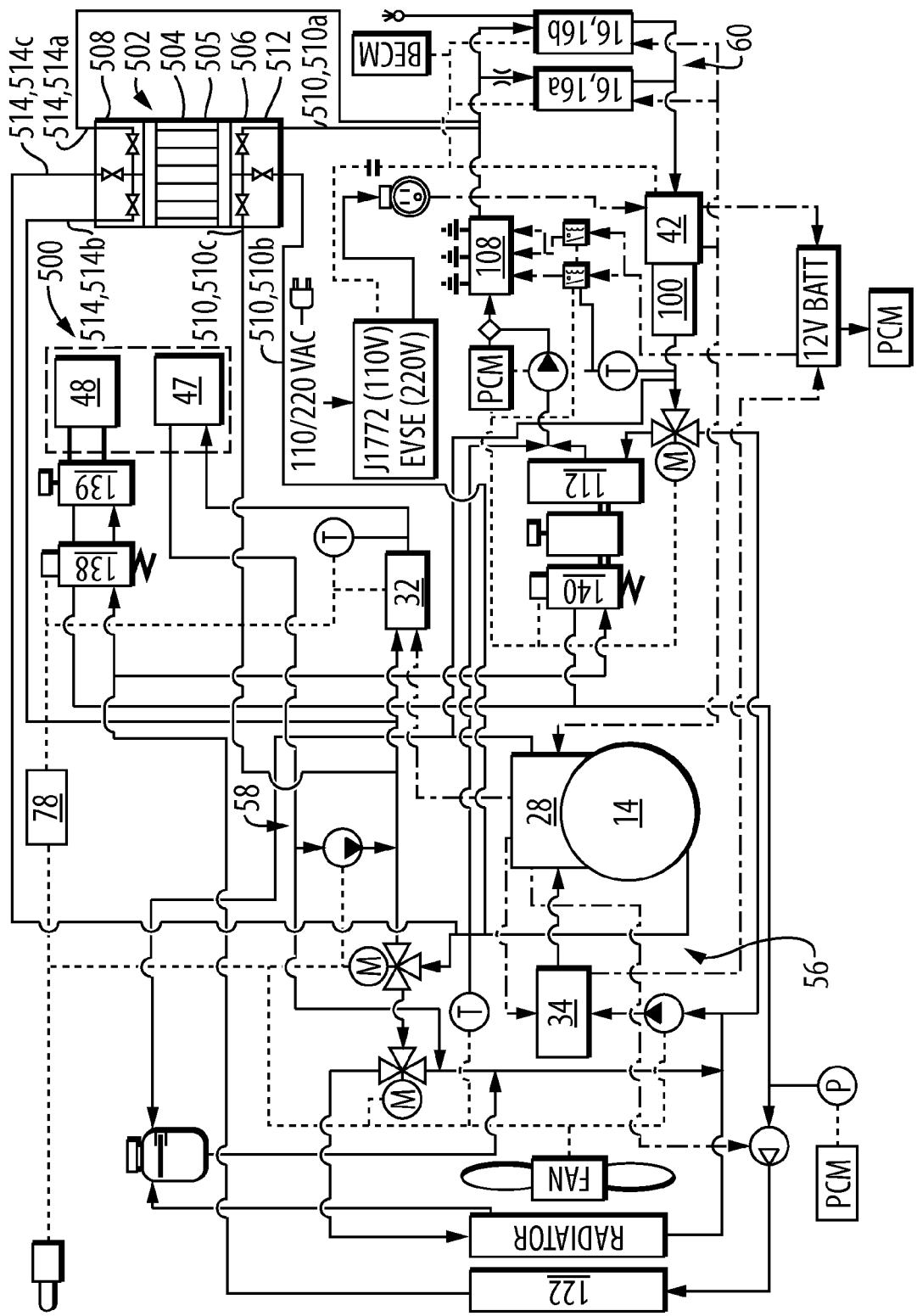
FIG. 7 is a schematic illustration of a thermal management system for the electric vehicle including a phase-change material module containing a phase-change material for the battery circuit, the cabin heating circuit and a motor circuit.

Reference is made to FIG. 7 which shows a thermal management system 500 which contains a phase-change material module 502 which contains a phase-change material 504. The phase-change material 504 may have any selected transition temperature such as, for example, 25 degrees Celsius. The phase-change material module 502 includes a heat exchanger 505, an inlet section 506 and an outlet section 508. Three draw conduits 510 (which may be referred to as inlet phase-change material module conduits) lead to the inlet section 506, including a battery circuit draw conduit 510a that carries coolant from the battery circuit 60 upstream from the battery circuit thermal load, a cabin heating circuit draw conduit 510b that carries coolant from the cabin heating circuit 58 upstream from the cabin heating circuit thermal load, and a motor circuit draw conduit 510c that carries coolant from the motor circuit 56, which may be downstream from the motor circuit thermal load. In the inlet section 506 there is an inlet valve system 512 that directs coolant from any selected one of the conduits 510a, 510b and 510c to the heat exchanger 505, while blocking flow from the other conduits 510. In the heat exchanger 505 the coolant is brought towards the transition temperature of the phase-change material 504, whether the coolant is initially hotter or colder than the transition temperature of the phase-change material 504. The phase-change material 504 may be conditioned when the vehicle 12 is on-plug to a state wherein a selected amount of the phase-change material 504 is in liquid form and a selected amount is in solid form so that the phase-change material 504 can efficiently heat coolant that is colder than the transition temperature and cool coolant that is warmer than the transition temperature.

Three return conduits 514 (which may be referred to as outlet phase-change material module conduits), shown individually at 514*a*, 514*b* and 514*c*, lead back from the outlet section 508 to the battery circuit 60 upstream from the battery circuit thermal load, the cabin heating circuit 58 upstream from the cabin circuit thermal load and the motor circuit 56 downstream from the motor circuit thermal load. The outlet section 508 contains an outlet valve system 516 that directs coolant leaving the heat exchanger 505 to any selected one of the return conduits 514*a*, 514*b* and 514*c*. The inlet and outlet valve systems 512 and 516 make up a valve system configured for controlling the flow of coolant through the first phase-change material module 602*a* from the cabin heating circuit 58, optionally based at least in part on the temperature of the coolant in relation to the first transition temperature of the first phase-change material 604*a* and for controlling the flow of coolant through the second phase-change material module 602*b* from the battery circuit 60, based at least in part on the temperature of the coolant in relation to the second transition temperature of the second phase-change material 604*b*.

Such a layout permits a single phase-change material module to be used to heat coolant in both the battery and cabin heating circuits 58 and 60, thereby simplifying the overall thermal management system 500 as compared to one with an individual phase-change material module for each circuit 58 and 60. Additionally, with this arrangement, when needed, coolant carrying waste heat from the motor circuit 56 can be sent to the phase-change material module 502 to recharge the phase-change material 504 (e.g. return the phase-change material to the initial, liquid, state).

In addition, by providing all of the phase-change material in one location that is accessible by any of the circuits 56, 58 and 60, a situation is avoided where the phase-change material from one circuit is depleted while there is phase-change material that would be useful but is unavailable because it is provided in a different circuit.

While the phase-change material module 502 is shown to be connectable to conduits leading to and from three circuits (i.e. the motor circuit 56, the battery circuit 60 and the cabin heating circuit 58) it is alternatively possible for the phase-change material module 502 to be connectable to conduits leading to and from a different number of circuits, such as the battery circuit 60 and the cabin heating circuit 58 only, or the battery circuit 60 and the motor circuit 56 only, or the cabin heating circuit 58 and the motor circuit 56 only.

Figure 8:
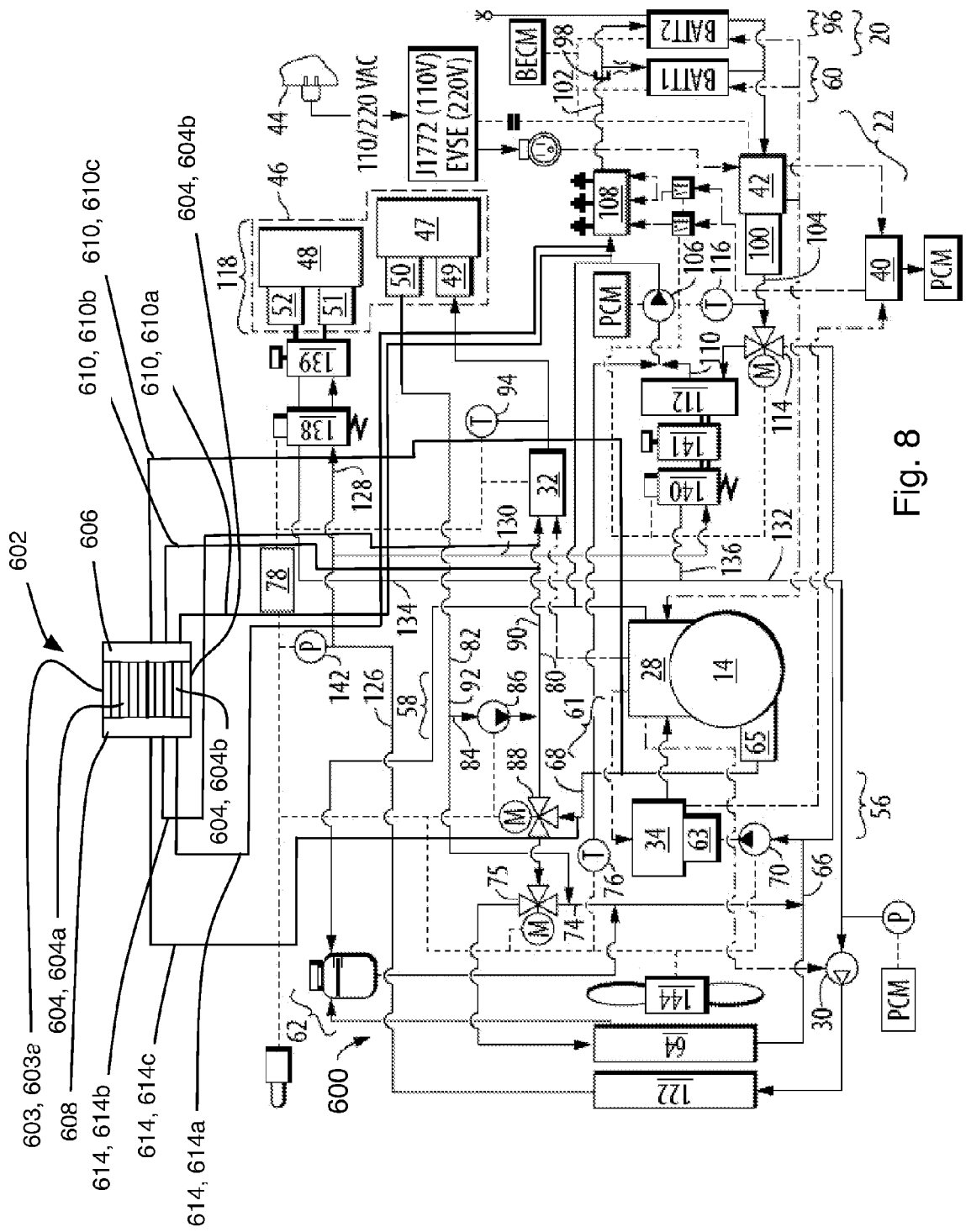
FIG. 8 is a schematic illustration of a thermal management system for the electric vehicle including a phase-change material module containing two phase-change materials for the battery circuit, the cabin heating circuit and a motor circuit.
Figure 8A:
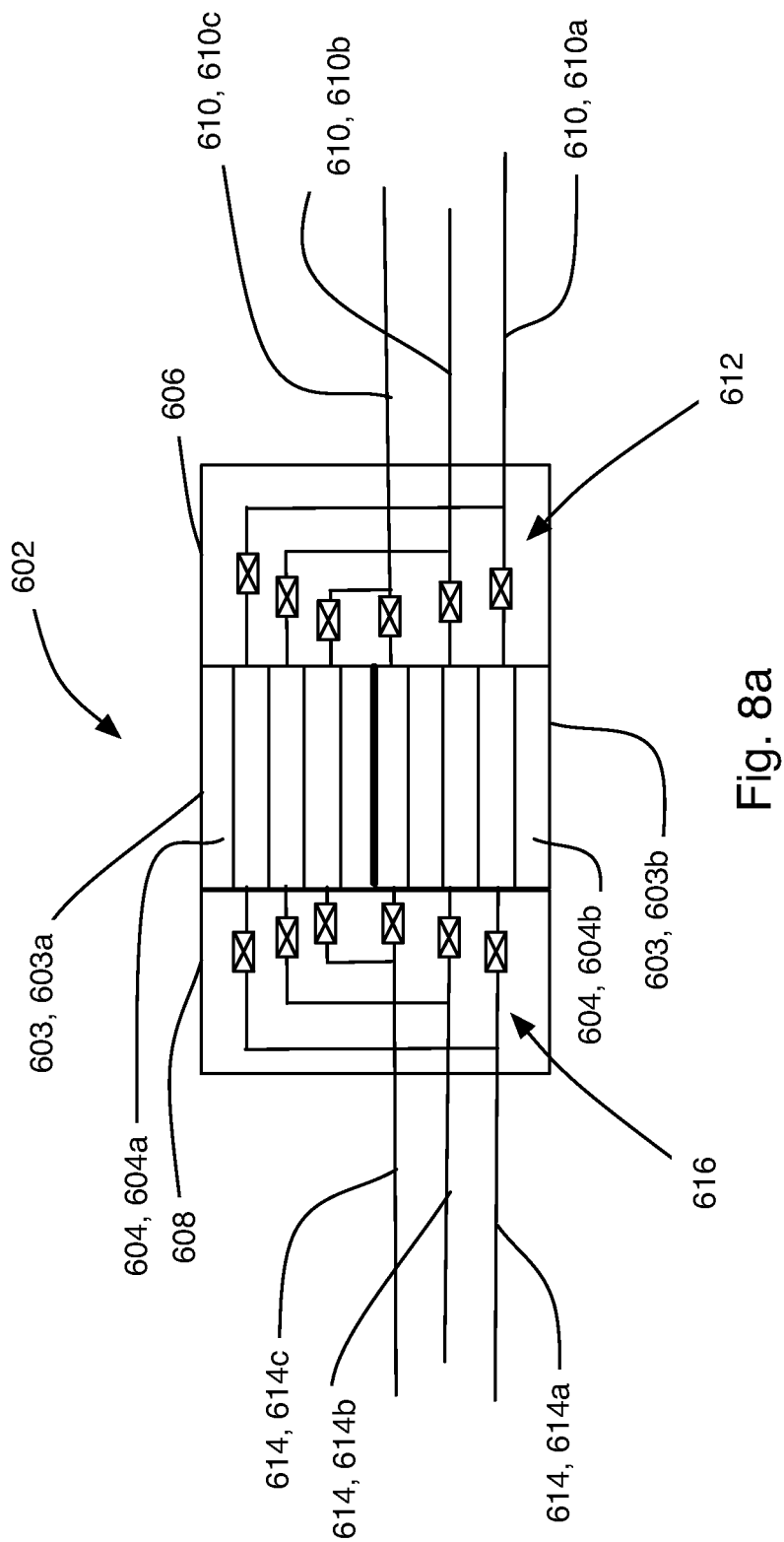
FIG. 8a is a magnified schematic view of a phase-change material module shown in FIG. 8.

In another embodiment, shown in FIG. 8, a thermal management system 600 is shown which contains a phase-change material module 602 which contains two heat exchangers 603, (shown individually at 603*a* and 603*b*), each of which contains a different phase-change material 604 (shown individually at 604*a* and 604*b*). Each phase-change material 604 may have a unique transition temperature. For example, the first phase-change material 604*a* may have a first transition temperature of 85 degrees Celsius, and the second phase-change material 604*b* may have a transition temperature of 0 degrees Celsius. The phase-change material module 602 includes an inlet section 606 and an outlet section 608. Three draw conduits 610*a*, 610*b* and 610*c* (which may be referred to as inlet phase-change material module conduits) lead to the inlet section 606, including a battery circuit draw conduit 610*a* that carries coolant from the battery circuit 60 upstream from the battery circuit thermal load, a cabin heating circuit draw conduit 610*b* that carries coolant from the cabin heating circuit 58 upstream from the cabin heating circuit thermal load, and a motor circuit draw conduit 610*c* that carries coolant from the motor circuit 56, which may be downstream from the motor circuit thermal load. The inlet section 606 includes an inlet valve system 612 (see FIG. 8*a*) that directs the flow from any selected draw conduit 610 to any selected heat exchanger 603, and that may simultaneously direct the flow from any other selected draw conduit 610 to the other heat exchanger 603. As an example, the coolant from the motor circuit 56 may be directed to the heat exchanger 605*a* to help heat the motor circuit thermal load, while the coolant from the battery circuit 60 may be directed to the heat exchanger 605*b* to help prevent overheating of the battery packs 16.

Three return conduits 614 (which may be referred to as outlet phase-change material module conduits), shown individually at 614*a*, 614*b* and 614*c*, lead back from the outlet section 608 to the battery circuit 60 upstream from the battery circuit thermal load, the cabin heating circuit 58 upstream from the cabin circuit thermal load and the motor circuit 56 downstream from the motor circuit thermal load. The outlet section 608 contains an outlet valve system 616 (FIG. 8*a*) that directs coolant leaving the heat exchanger 602 to any selected one of the return conduits 614*a*, 614*b* and 614*c*.

It will be understood that providing different phase-change materials with different transition temperatures can provide greater heating and cooling performance than providing a single phase-change material with a single phase-change material with a single transition temperature, since in the first case there will be greater temperature differences between the coolant and the phase-change material than there would be in the second case.

While the phase-change material module 602 is shown to be connectable to conduits leading to and from three circuits (i.e. the motor circuit 56, the battery circuit 60 and the cabin heating circuit 58) it is alternatively possible for the phase-change material module 502 to be connectable to conduits leading to and from a different number of circuits, such as the battery circuit 60 and the cabin heating circuit 58 only.

While the phase-change material module 602 is shown as containing two heat exchangers with two phase-change materials 604, it is possible to provide a different number of heat exchangers with a different number of phase-change materials, such as, for example, three or more heat exchangers with three or more phase-change materials. Optionally each of the phase-change materials can have a unique transition temperature. Alternatively, two phase-change materials may have the same transition temperature, permitting two conduits to be directed to phase-change materials having the same transition temperatures.

Similarly to the embodiment shown in FIG. 7, by providing a connection with the motor circuit 56, coolant carrying waste heat from the motor circuit 56 can be used to recharge the phase-change material 604 in at least one of the heat exchangers, such as the phase-change material 604*a*.

Figure 9:
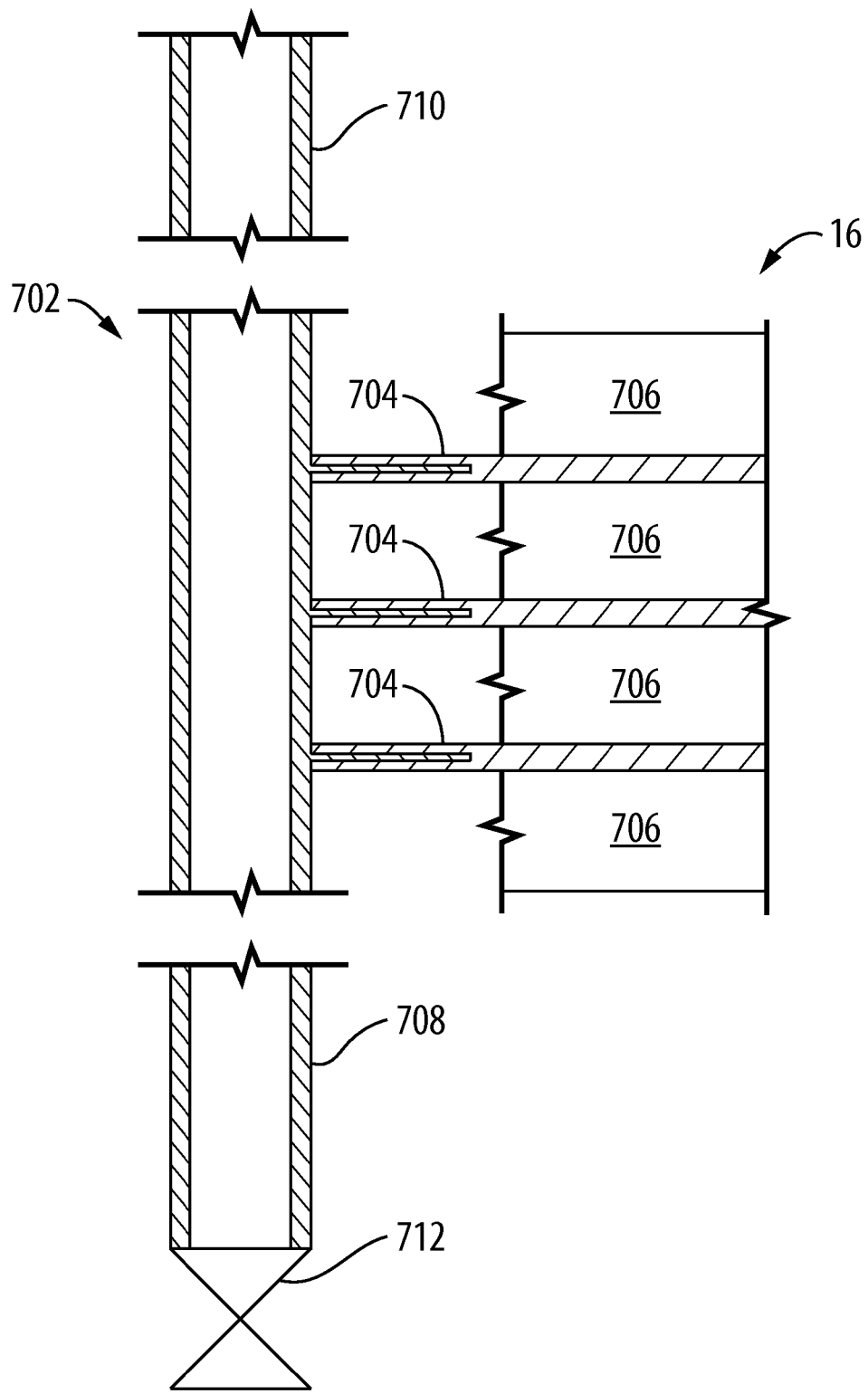
FIG. 9 is a sectional side view of a portion of a battery pack in the vehicle shown in FIG. 1, with a phase-change material between cells in the battery pack.

Referring to FIG. 9, in another embodiment the phase-change material could be used to directly heat or cool particular thermal load instead of heating or cooling coolant. For example, a phase-change material module 702 could be provided in each battery pack 16, wherein phase-change material 704 is positioned between the individual cells, shown at 706. In this way, the phase-change material 704 can maintain the battery pack 16 at a relatively constant temperature and can reduce the likelihood for there to be a temperature gradient across the battery pack 16. Such temperature gradients can be detrimental to the performance of the battery pack because some of the cells may be kept at or near a desired temperature but other cells are not, and are potentially so far from the desired temperature that their operating life is negatively affected. The phase-change material 704 placed between the cells 706 provides a way of reducing the temperature gradient between the cells and of bringing the cells towards a common temperature (i.e. the transition temperature of the phase-change material 704). The phase-change material 704 is easier in at least some respects to provide between adjacent cells than a coolant transport system is, since the phase-change material 704 itself (at least the portion of the phase-change material 704 between the cells 706) can be in the form of a fin, and thus need not be a hollow liquid transporting conduit. As such the phase-change material 704 can easily have a relatively large surface area of contact with the cells 706.

The phase-change material module 702 is thermally connected to some heating source, such as the battery circuit heater 108 (FIG. 2), so that the phase-change material 702 can be recharged when the vehicle 12 is on-plug.

Additionally, the phase-change material module 702 may be connected specifically to the motor circuit 56 via draw and return coolant conduits 708 and 710 with a control valve 712 on one of the conduits 708 or 710 to control coolant flow through the phase-change material module 702 from the motor circuit 56 (FIG. 2). This permits the phase-change material module 702 to be recharged using waste heat from the motor circuit 56, particularly while the vehicle 12 is being driven and is therefore off-plug.

While the transition temperature has been described herein as being a transition temperature between solid and liquid phases for the phase-change material, it will be noted that other types of phase-change material could be used, such as solid-solid phase-change materials, for example.

Figure 10:
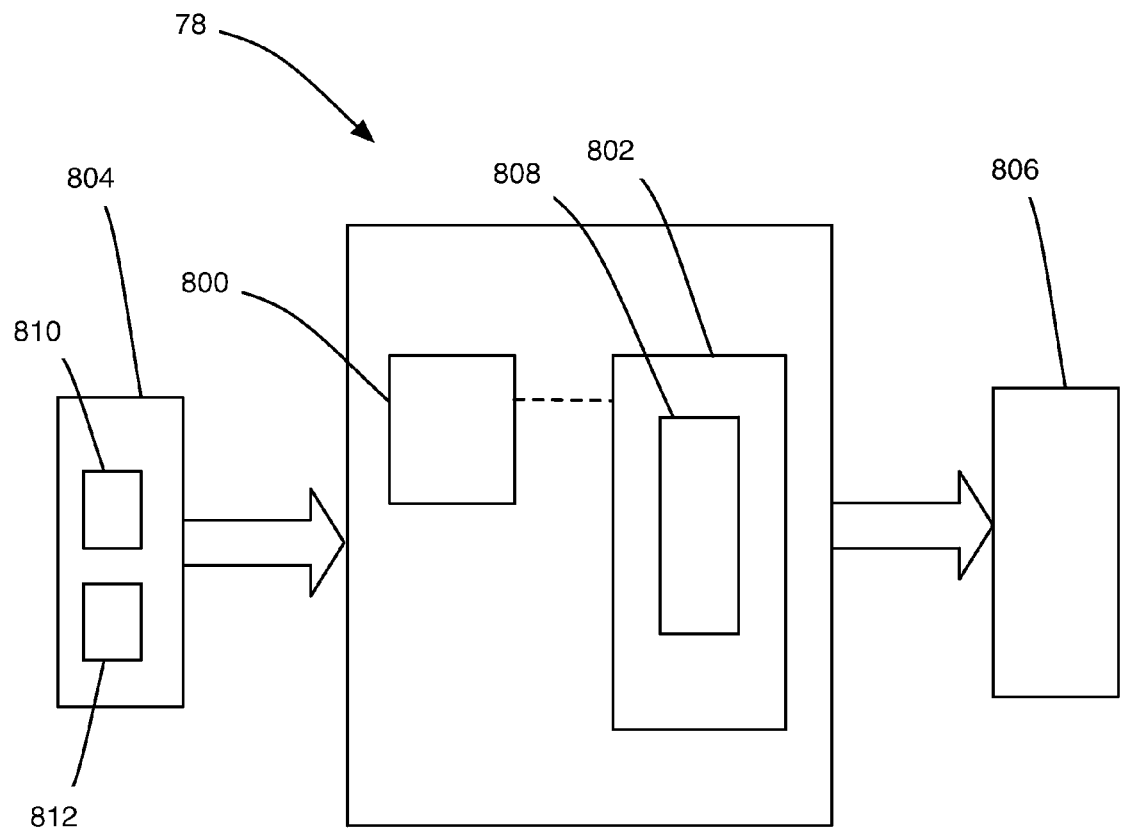
FIG. 10 is a schematic illustration of a control system shown in FIG. 2.

Reference is made to FIG. 10, which focuses on the control system 78. The control system 78, in the example shown in FIG. 10, includes a processor 800 and memory 802, and has a plurality of inputs 804 and a plurality of outputs 806. The memory 802 contains executable code 808 that is executed by the processor 800. By virtue of the code 808, the control system 78 is programmed to:

a) determine whether there is a need to heat the cabin 18;

b) determine whether to send coolant from the motor circuit 56 to the cabin heating circuit 58 to heat the cabin 18 based on the determination made in step a) and based at least in part on the temperature of coolant in the motor circuit 56;

c) determine whether to send coolant to the phase-change material module 302, 502, 602 based on the determinations made in steps a) and b); and d) control the flow of coolant through the motor circuit 56, through the cabin heating circuit 58 and through the phase-change material module 302, 502, 602 (e.g. by sending appropriate signals to appropriate valves) based on the determinations made in steps a), b) and c).

Step a) may be carried out based on inputs including signals from a temperature control panel 810 in the vehicle cabin 18, the ambient temperature sensor shown at 812, and optionally based on other inputs also. For example, the control system 78 may determine that the cabin 18 needs heating if the temperature of air entering the cabin 18 is lower than the temperature requested at the temperature control panel 810.

Regarding step b), the control system 78 may determine that coolant is to be sent to the cabin heating circuit 58 if in step a) it is determined that the cabin 18 needs heating and if the temperature sensed at motor circuit temperature sensor 76 is sufficiently higher than the temperature requested at the temperature control panel 810. Thus, the motor circuit temperature sensor 76 is another input to the control system 78.

Regarding step c), the control system 78 may determine that coolant is to be sent to the phase-change material module 302, 502, 602 if in step a) it is determined that the cabin 18 needs heating and if the temperature sensed at motor circuit temperature sensor 76 is not sufficiently higher than the temperature requested at the temperature control panel 810. At step d), the control system 78 controls the flow of coolant through the motor circuit 56, through the cabin heating circuit 58 and through the phase-change material module 302, 502, 602 based on the determinations made in steps a), b) and c).

The control system 78 may be programmed to prevent the flow of coolant through the phase-change material module 302, 502, 602 if in step a) it is determined that the cabin 18 does not need heating or if the temperature sensed at motor circuit temperature sensor 76 is sufficiently higher than the temperature requested at the temperature control panel 810. In other words, the control system 78 may be programmed to prevent the flow of coolant through the phase-change material module 302, 502, 602 based in part on if the determination made in step a) is positive and based in part on if the determination made in step b) is positive, and to permit the flow of coolant through the phase-change material module 302, 502, 602 based in part on if the determination made in step a) is positive and based in part on if the determination made in step b) is negative.

The control system 78 may be programmed to control the temperature of the phase-change material module 302, 502, 602 using the electric heater 32 when the vehicle 12 is on-plug.

The control system 78 may additionally or alternatively be programmed to:

a) determine whether there is a need to heat the battery packs 16;

b) determine whether to send coolant from the motor circuit 56 to the battery circuit 60 to heat the battery packs 16 based on the determination made in step a) and based at least in part on the temperature of coolant in the motor circuit 56;

c) determine whether to send coolant to the phase-change material module 402, 502, 602 based on the determinations made in steps a) and b); and d) control the flow of coolant through the motor circuit 56, through the battery circuit 60 and through the phase-change material module 402, 502, 602 (e.g. by sending appropriate signals to appropriate valves) based on the determinations made in steps a), b) and c).

Step a) may be carried out based on inputs including signals from a battery circuit temperature sensor 116 in the battery circuit 60, and optionally based on other inputs also. For example, the control system 78 may determine that the battery circuit 60 needs heating if the temperature of coolant in the battery circuit 60 is lower than a minimum acceptable temperature.

Regarding step b), the control system 78 may determine that coolant is to be sent to the battery circuit 60 if in step a) it is determined that the battery circuit 60 needs heating and if the temperature sensed at motor circuit temperature sensor 76 is sufficiently higher than the aforementioned minimum acceptable temperature.

Regarding step c), the control system 78 may determine that coolant is to be sent to the phase-change material module 402, 502, 602 if in step a) it is determined that the battery circuit 60 needs heating and if the temperature sensed at motor circuit temperature sensor 76 is not sufficiently higher than the minimum acceptable temperature. At step d), the control system 78 controls the flow of coolant through the motor circuit 56, through the battery circuit 60 and through the phase-change material module 402, 502, 602 based on the determinations made in steps a), b) and c).

The control system 78 may be programmed to prevent the flow of coolant through the phase-change material module 402, 502, 602 if in step a) it is determined that the battery circuit 60 does not need heating or if the temperature sensed at motor circuit temperature sensor 76 is sufficiently higher than the aforementioned minimum acceptable temperature. In other words, the control system 78 may be programmed to prevent the flow of coolant through the phase-change material module 402, 502, 602 based in part on if the determination made in step a) is positive and based in part on if the determination made in step b) is positive, and to permit the flow of coolant through the phase-change material module 402, 502, 602 based in part on if the determination made in step a) is positive and based in part on if the determination made in step b) is negative.

As noted above, it is possible to provide an embodiment wherein there are provided more than one phase-change material module. For example, in an embodiment, both the phase-change material module 202 and the phase-change material module 302 may be provided, with their associated valves and conduits. In embodiments wherein there is provided a first phase-change material module (e.g. module 302) that includes a first phase-change material (e.g. material 304) that has a selected first transition temperature, and a second phase-change material module (e.g. module 202) that includes a second phase-change material (e.g. material 204) that has a selected second transition temperature, the control system 78 may be programmed to:

a) determine a target temperature for coolant in the battery circuit 60;
b) determine whether the second phase change material 204 is depleted;
c) determine whether the first phase change material 304 is depleted and if the first phase change material 304 can drive the temperature of the coolant in the battery circuit 60 towards the target temperature; and
d) control a valve system (e.g. by sending appropriate signals to appropriate valves) to send coolant flow from the battery circuit through the first phase-change material module 302. The valve system is configured for controlling the flow of coolant through the first phase-change material module 302 from the cabin heating circuit 58 and for controlling the flow of coolant through the second phase-change material module 202 from the battery circuit 60. In the example embodiment shown, the valve system includes the control valves 88 and 114, which control the fluid communication between the motor circuit 56 and the cabin heating circuit 58 and between the motor circuit 56 and the battery circuit 60, and therefore between the battery circuit 60 and the cabin heating circuit 58.

With respect to FIG. 10, the outputs 806 may constitute any signals sent by the control system 78 to control valves that are part of a valve system, or more generally any signals sent by the control system 78 in order to control the flow of coolant and/or refrigerant through any circuits or conduits.

It will be noted that in embodiments wherein the phase change material is used primarily for heating the phase change material may be recharged using some type of heating means when the vehicle 12 is on-plug, as noted above. However, in embodiments wherein the phase change material is used primarily for cooling, the phase change material may be recharged by cooling the phase change material (e.g. with the refrigerant).

While the above description constitutes a plurality of embodiments, it will be appreciated that the examples shown and described herein are susceptible to further modification and change without departing from the fair meaning of the accompanying claims.

The invention claimed is:

1. A thermal management system for a vehicle having an electric traction motor, a battery pack and a passenger cabin, comprising:

a battery circuit for circulating coolant through the battery pack;
a cabin cooling circuit for circulating coolant through a cabin circuit thermal load including a compressor, a condenser and an evaporator;
the cabin cooling circuit including a first cooling circuit conduit and a second cooling circuit conduit, the first cooling circuit conduit including a first branch extending from the condenser to the evaporator and a second branch extending from the first branch to the battery circuit, and the second cooling circuit conduit including a third branch extending from the evaporator to the compressor and a fourth branch extending from the battery circuit to the third branch for circulating the coolant to the compressor; and
a phase-change material module that includes a phase-change material that has a selected transition temperature, and which is positioned along the second cooling circuit conduit upstream from the compressor and downstream from the evaporator, and wherein the transition temperature of the phase-change material is based at least in part on the temperature of the coolant in relation to the transition temperature of the phase-change material.

2. A thermal management system as claimed in claim 1, wherein a cooling device is positioned for cooling the phase-change material to recharge the phase-change material; and
wherein the thermal management system further comprises a control system programmed to control the temperature of the phase-change material using the cooling device when the vehicle is on-plug.

3. A thermal management system as claimed in claim 2, wherein the cooling device is the evaporator.

4. A thermal management system as claimed in claim 1 further including a first flow control valve positioned along the first branch of the first cooling circuit conduit downstream from the condenser and upstream from the evaporator for controlling the flow of coolant to the evaporator.

5. A thermal management system as claimed in claim 1 further including a first flow control valve positioned along the third branch of the second cooling circuit conduit downstream from the evaporator and upstream from the phase-change material module for controlling the flow of coolant to the phase-change material module.

6. A thermal management system as claimed in claim 1, wherein the battery circuit includes a chiller positioned upstream from the battery pack for cooling the coolant flowing from the battery pack to the phase-change material module.

7. A thermal management system as claimed in claim 1, wherein the phase-change material module is positioned downstream from the battery circuit.

8. A thermal management system as claimed in claim 1, wherein the phase-change material module facilitates heat exchange between the phase change material and the coolant.

9. A thermal management system as claimed in claim 1, wherein the transition temperature of the phase-change material ranges from 0 degrees Celsius to 85 degrees Celsius.

10. A thermal management system as claimed in claim 1, wherein the phase-change material module includes a shell surrounding a plurality of tubes, the phase-change material flows through the shell, and the coolant flows through the tubes.

11. A thermal management system as claimed in claim 1, wherein the phase-change material includes flow passages therethrough, and the coolant flows through the flow passages of the phase-change material.

12. A thermal management system as claimed in claim 1, wherein the phase-change material module includes a matrix and fins, the matrix is formed of graphite and holds the phase-change material, and the fins are formed of a conductive metal and pass through the matrix and the phase-change material.

13. A thermal management system as claimed in claim 1, wherein the phase change material is a positive temperature organic material or a hydrated salt material.

14. A thermal management system as claimed in claim 4 further including a second flow control valve positioned along the second branch of the first cooling circuit conduit downstream from the evaporator and upstream from the battery circuit for controlling the flow of coolant to the battery circuit.

15. A thermal management system as claimed in claim 5 further including a second flow control valve positioned along the fourth branch of the second cooling circuit conduit downstream from the battery circuit and upstream from the phase-change material module for controlling the flow of coolant to the phase-change material module.

16. A thermal management system for a vehicle, comprising:
    an electric traction motor;
    at least one battery pack for providing power to the electric traction motor;
    a battery circuit for circulating coolant through the at least one battery pack;
    a cabin cooling circuit for circulating coolant through a compressor, a condenser, and an evaporator;
    the cabin cooling circuit including a first cooling circuit conduit and a second cooling circuit conduit;
    the first cooling circuit conduit including a first branch extending from the condenser to the evaporator and a second branch extending from the first branch to the battery circuit;
    the second cooling circuit conduit including a third branch extending from the evaporator to the compressor and a fourth branch extending from the battery circuit to the third branch for circulating the coolant to the compressor;
    a phase-change material module including a phase-change material positioned along the second cooling circuit upstream from the compressor and downstream from the evaporator and the battery circuit for exchanging heat between the phase-change material and the coolant before the coolant flows to the compressor.

17. A thermal management system as claimed in claim 16, wherein the battery circuit includes a chiller positioned upstream from the at least one battery pack for cooling the coolant flowing from the at least one battery pack to the phase-change material module.

18. A thermal management system as claimed in claim 16, wherein the phase-change material module is positioned downstream from the battery circuit.

19. A thermal management system as claimed in claim 16, wherein the phase-change material includes flow passages therethrough, and the coolant flows through the flow passages.

20. A thermal management system as claimed in claim 16, wherein the phase-change material module includes a matrix and fins, the matrix is formed of graphite and holds the phase-change material, and the fins are formed of a conductive metal and pass through the matrix and the phase-change material.

* * * * *